United States Patent
Guo et al.

(10) Patent No.: US 11,259,020 B2
(45) Date of Patent: Feb. 22, 2022

(54) DETERMINING PALETTES IN PALETTE-BASED VIDEO CODING

(71) Applicant: QUALCOMM Incorporated, San Diego, CA (US)

(72) Inventors: Liwei Guo, San Diego, CA (US); Marta Karczewicz, San Diego, CA (US); Joel Sole Rojals, La Jolla, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 825 days.

(21) Appl. No.: 14/244,688

(22) Filed: Apr. 3, 2014

(65) Prior Publication Data

US 2014/0301474 A1    Oct. 9, 2014

Related U.S. Application Data

(60) Provisional application No. 61/809,236, filed on Apr. 5, 2013, provisional application No. 61/810,649, filed on Apr. 10, 2013.

(51) Int. Cl.
| | |
|---|---|
| *H04N 19/119* | (2014.01) |
| *H04N 19/90* | (2014.01) |
| *H04N 19/93* | (2014.01) |
| *H04N 19/50* | (2014.01) |
| *H04N 19/46* | (2014.01) |

(52) U.S. Cl.
CPC .......... *H04N 19/119* (2014.11); *H04N 19/46* (2014.11); *H04N 19/50* (2014.11); *H04N 19/90* (2014.11); *H04N 19/93* (2014.11)

(58) Field of Classification Search
None
See application file for complete search history.

(56) References Cited

U.S. PATENT DOCUMENTS

| | | | |
|---|---|---|---|
| 5,686,961 | A | 11/1997 | Gasztonyi |
| 5,796,864 | A | 8/1998 | Callahan |
| 5,930,390 | A | 7/1999 | Coelho |
| 6,008,816 | A | 12/1999 | Eisler et al. |
| 6,256,415 | B1 | 7/2001 | Ratnakar |
| 6,298,163 | B1 | 10/2001 | Sodagar et al. |

(Continued)

FOREIGN PATENT DOCUMENTS

| | | |
|---|---|---|
| BR | 112015025439 A2 | 7/2017 |
| CN | 1241871 A | 1/2000 |

(Continued)

OTHER PUBLICATIONS

"Truncated binary Coding" Wikipedia, the free encyclopedia, downloaded on Dec. 23, 2015, URL: https://en.wikipedia.org/wiki/Truncated_binary_encoding, 4 pp.

(Continued)

*Primary Examiner* — Mikhail Itskovich
(74) *Attorney, Agent, or Firm* — Shumaker & Sieffert, P.A.

(57) ABSTRACT

In an example, a method of coding video data includes determining a first palette having first entries indicating first pixel values, determining, based on the first entries of the first palette, one or more second entries indicating second pixel values of a second palette, and coding pixels of a block of video data using the second palette.

28 Claims, 8 Drawing Sheets

(56) References Cited

U.S. PATENT DOCUMENTS

| | | | |
|---|---|---|---|
| 6,496,601 B1 | 12/2002 | Migdal et al. | |
| 6,574,372 B2 | 6/2003 | Ratnakar | |
| 6,748,116 B1* | 6/2004 | Yue | G06T 9/004 |
| | | | 382/238 |
| 7,343,037 B1* | 3/2008 | Kadatch | H04N 1/644 |
| | | | 382/166 |
| 7,343,837 B1 | 3/2008 | Domanico et al. | |
| 8,615,138 B2 | 12/2013 | Alakuijala | |
| 9,024,862 B2 | 5/2015 | Rhodes | |
| 2001/0019630 A1 | 9/2001 | Johnson | |
| 2003/0093817 A1* | 5/2003 | Lee | H04N 21/43637 |
| | | | 725/151 |
| 2003/0118242 A1 | 6/2003 | Nakayama et al. | |
| 2003/0156188 A1 | 8/2003 | Abrams et al. | |
| 2003/0169632 A1 | 9/2003 | Shore | |
| 2003/0169932 A1 | 9/2003 | Li et al. | |
| 2003/0202602 A1 | 10/2003 | Apostolopoulos et al. | |
| 2004/0071351 A1 | 4/2004 | Rade | |
| 2004/0151372 A1 | 8/2004 | Reshetov et al. | |
| 2004/0151394 A1 | 8/2004 | Soderberg et al. | |
| 2004/0213469 A1 | 10/2004 | Apostolopoulos et al. | |
| 2005/0008224 A1 | 1/2005 | Caruso et al. | |
| 2005/0231396 A1 | 10/2005 | Dunn | |
| 2006/0050076 A1 | 3/2006 | Jeong | |
| 2006/0184705 A1 | 8/2006 | Nakajima | |
| 2007/0014353 A1 | 1/2007 | Yourlo et al. | |
| 2007/0223579 A1 | 9/2007 | Bao | |
| 2008/0101464 A1 | 5/2008 | Lei | |
| 2008/0144952 A1 | 6/2008 | Chen et al. | |
| 2008/0196076 A1 | 8/2008 | Shatz et al. | |
| 2008/0267293 A1 | 10/2008 | Swami et al. | |
| 2010/0046628 A1 | 2/2010 | Bhaskaran et al. | |
| 2010/0214315 A1 | 8/2010 | Nguyen et al. | |
| 2011/0110416 A1 | 5/2011 | Lawrence | |
| 2012/0294353 A1 | 11/2012 | Fu et al. | |
| 2013/0101033 A1 | 4/2013 | Joshi et al. | |
| 2013/0300591 A1 | 11/2013 | Marpe et al. | |
| 2014/0301475 A1 | 10/2014 | Guo | |
| 2015/0016501 A1 | 1/2015 | Guo et al. | |
| 2015/0016545 A1 | 1/2015 | Ramasubramonian et al. | |
| 2015/0078443 A1 | 3/2015 | Kolesnikov | |
| 2015/0186100 A1 | 7/2015 | Tsai et al. | |
| 2015/0373339 A1 | 12/2015 | Zou | |
| 2016/0323591 A1 | 11/2016 | Chuang et al. | |

FOREIGN PATENT DOCUMENTS

| | | |
|---|---|---|
| CN | 1411664 A | 4/2003 |
| CN | 101211341 A | 7/2008 |
| JP | 2002142119 A | 5/2002 |
| JP | 2002369011 A | 12/2002 |
| JP | 2004054880 A | 2/2004 |
| KR | 20010095835 A | 11/2001 |
| KR | 20080106185 A | 12/2008 |
| KR | 101058010 B1 | 8/2011 |
| RU | 2420021 C2 | 5/2011 |
| WO | 01/50766 A1 | 7/2001 |
| WO | 2006022741 A1 | 3/2006 |
| WO | 2014165789 A1 | 1/2014 |
| WO | 2015006724 A2 | 1/2015 |

OTHER PUBLICATIONS

Slam M.R., et al., "A new image compression scheme using repeat reduction and arithmetic coding", Computers and Information Technology, 2009, ICCIT '09, 12th International Conference on, IEEE, Piscataway, NJ, USA, Dec. 21, 2009, pp. 209-214, XP031624511.
Erh-Chung Ke et al., "Non-RCE4: Advanced copy mode for Palette Coding", 16 JCTVC Meeting, Jan. 9 through 17, 2014; San Jose; (Joint Collaborative Team on Video Coding of ISO/IEC JTC1/SC29/WG11 and ITU-T SG.I6); URL: http://wftp3.itu.int/av-arch/jctvc-site/, No. JCTVC-P0090, 5 pp.
G. Gisquet, G. Laroche, and P. Onno, "Non-RCE4: Transition copy mode for Palette mode," 16th Meeting;San Jose, US, Jan. 9-14, 2014; Joint Collaborative Team on Video Coding of ITU-T SG 16 WP 3 and ISO/IEC JTC1/SC 29/WG11)); URL: http://wftp3.itu.int/av-arch/jctvc-site/, No. JCTVC-P0115, 6 pp.
Guo L., et al., "Color palette for screen content coding", 2014 IEEE International Conference on Image Processing (ICIP), Oct. 1, 2014, pp. 5556-5560, XP055179887, DOI:10.1109/ICIP.2014.7026124, ISBN 978-1-47-995751-4.
Guo L., et al., "Evaluation of Palette Mode Coding on HM-12.0+ RExt-4.1", 15. JCT-VC Meeting; Oct. 23, 2013 through Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00218-v3, Oct. 23, 2013, XP030115268, 7 pages.
Guo X., et al., "AHG8: Major-color-based screen content coding", 15. JCT-VC Meeting; Oct. 23, 2013 through Nov. 1, 201; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-00182-v3, Oct. 25, 2013, XP030115219, 10 pages.
Guo, Xun. et al., "RCE4: Summary Report of HEVC Ranger Extensions Core Experiments 4 (RCE-4) on palette coding for screen content", 16. JCT-VC Meeting; Jan. 9 through 17, 2015; San Jose; (Joint Collaborative Team on Video Coding of ISO/IEC JTC1/SC29/WG11 and ITU-T SG.I6);URL: http://wftp3.itu.int/av-arch/jctvc-site/, No. JCTVC-P0035, 8 pp.
Pu W., et al., "Non-RCE4: Refinement of the palette in RCE4 Test 2", 16. JCT-VC Meeting; Jan. 9-Jan. 17, 2014; San Jose; (Joint Collaborative Team on Video Coding of ISO/IEC JTC1/SC29/WG11 and ITU-T SG.I6); URL: http://wftp3.itu.int/av-arch/jctvc-site/, No. JCTVC-P0231-v5, Jan. 12, 2014, XP030115774, 4 pages.
Guo, et al., "RCE4: Test 1. Major-color-based screen content coding", 16. JCT-VC Meeting; Jan. 9 through 17, 2014; San Jose; (Joint Collaborative Team on Video Coding of ISO/IEC JTC1/SC29/WG11 and ITU-T SG.I6); URL: http://wftp3.itu.int/av-arch/jctvc-site/, No. JCTVC-P0108, 12 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video,

(56) References Cited

OTHER PUBLICATIONS

Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Description of screen content coding technology proposal by Qualcomn", JCT-VC Meeting; Valencia, (Joint Collaborative Team on Video Coding of ISO/IEC JTC1/SC29/WG11 and ITU-T SG.16), No. JCTVC-Q0031-v3, Mar. 28, 2014, XP030115916, 19 pp.
Lin, et al., "Compound Image Compression for Real-Time Computer Screen Image Transmission", IEEE Transactions on Image Processing, IEEE Service Center, Piscataway, NJ, US, vol. 14, No. 8, Aug. 8, 2005, XP011136219, ISSN: 1057-7149, DOI:10.1109/TIP.2005.849776, pp. 993-1005.
Lan, et al., "Compress Compound Images in H.264/MPGE-4 AVC by Exploiting Spatial Correlation", IEEE Transactions on Image Processing, IEEE Service Center, Piscataway, NJ, US, vol. 18, No. 4, Apr. 2010, XP011298469, ISSN: 1057-7149, pp. 946-957.
Lan, et al., "Intra and inter coding tools for screen contents", IEEE Service Center, No. JCTVC-E145, Mar. 16-23, 2011, XP030008651, 11 pp.
Murray, et al., "Run-Length Encoding (RLE)", Encyclopedia of graphics file formats (2nd Edition), Apr. 1, 1996 (Apr. 1, 1996), XP55126024, ISBN: 978-1-56 592161-0, [retrieved on Jun. 30, 2014], 9 pp.
Guo, et al., "Palette Mode for Screen Content Coding," (Joint Collaborative Team on Video Coding of ISO/IEC JTC1/SC29/WG11 and ITU-T SG.16), Apr. 18-26, 2013, Document: JCTVC-M0323, 12 pp.
Lan, et al., "Compression of Compound Images by Combining Several Strategies," IEEE Service Center, Oct. 17-19, 2011, 6 pp.
Lan, et al., "Scren content coding," (Joint Collaborative Team on Video Coding of ISO/IEC JTC1/SC29/WG11 and ITU-T SG.16), Jul. 21-28, 2010, Document: JCTVC-B084_r1, 10 pp.
Guo, et al., "RCE4: Results of Test 2 on Palette Mode for Screen Content Coding", JCT-VC Meeting; San Jose (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198-v3, Jan. 8, 2014 (Jan. 8, 2014), XP030115731, 5 pp.
Ivanov, et al., "Color Distribution—A New Approach to Texture Compression", Computer Graphics Forum, Wiley-Blackwell Publishing Ltd, GB, vol. 19, No. 3, Aug. 21, 2000, 8 pp.
Laroche, et al., "Non-RCE4: Palette Prediction for Palette mode", JCT-VC Meeting; Jan. 9-17, 2014; San Jose; (Joint Collaborative Team on Video Coding of ISO/IEC JTC1/SC29/WG11 and ITU-TSG.16 ) URL: http://wftp3.itu.int/av-arch/jctvc-site/,, No. JCTVC-P0114-v3, 6 pp.
Zhu, et al., "Template-based palette prediction", JCT-VC Meeting; Apr. 18-26, 2013; Vienna; (Joint Collaborative Team on Video Coding of ISO/IEC JTC1/SC29/WG11 and ITU-TSG.16 ) ; URL: http://wftp3.itu.int/av-arch/jctvc-site/, No. JCTVC-N0169, XP030114647, 3 pp.
International Search Report and Written Opinion from International Application No. PCT/US2014/033019, dated Jul. 14, 2014, 12 pp.
Response to Written Opinion dated Jul. 14, 2014, from International Application No. PCT/US2014/033019, filed on Feb. 5, 2015, 5 pp.
Second Written Opinion from International Application No. PCT/US2014/033019, dated Mar. 18, 2015, 5 pp.
Response to Second Written Opinion dated Mar. 18, 2015, from International Application No. PCT/US2014/033019, filed on May 14, 2015, 21 pp.
International Preliminary Report on Patentability from International Application No. PCT/US2014/033019, dated Jul. 1, 2015, 8 pp.

U.S. Appl. No. 14/743,883, filed by Zou, et al., on Jun. 18, 2015.
International Search Report and Written Opinion from International Application No. PCT/US2014/033013, dated Jul. 14, 2014, 12 pp.
Response to Written Opinion dated Jul. 14, 2014, from International Application No. PCT/US2014/033013, filed on Feb. 5, 2015, 5 pp.
Informal Communications with the Applicant from International Application No. PCT/US2014/033013, dated Mar. 19, 2015, 4 pp.
Response to Informal Communications with the Applicant dated Mar. 19, 2014 from International Application No. PCT/US2014/033013, filed on May 19, 2015, 20 pp.
International Preliminary Report on Patentability from International Application No. PCT/US2014/033013, dated Jul. 1, 2015, 7 pp.
Guo, et al., "Non-RCE3: Modified Palette Mode for Screen Content Coding," JCT-VC Meeting; Jul. 25-Aug. 2, 2013, Vienna, (Joint Collaborative Team on Video Coding of ISO/IEC JTC1/SC29/WG11 and ITU-T SG.16 ), URL: http://wftp3.itu.int/av-arch/jctvc-site/, No. JCTVC-N0249, XP030114767, 6 pp.
Zhang, et al., "AHG7: An efficient coding method for DLT in 3D-HEVC", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-E0176-v3, XP030131209, 5 pp.
Zou, et al., "CE18: Test 7.1 Constrained Run For Intra String Copy", JCT-VC Meeting, Oct. 17-24, 2014, Strasbourg, (Joint Collaborative Team on Video Coding of ISO/IEC JTC1/SC29/WG11 and ITU-T SG.16), URL: http://wftp3.itu.int/av-arch/jctvc-site/, No. JCTVC-S0175, XP030116955, 3 pp.
Zou, et al., "CE6: Test C.3 Copy Previous Row Mode For Palette Coding," JCT-VC Meeting, Oct. 17-24, 2014, Strasbourg, (Joint Collaborative Team on Video Coding of ISO/IEC JTC1/SC29/WG11 and ITU-T SG.16 ), URL: http://wftp3.itu.int/av-arch/jctvc-site/, No. JCTVC-S0174, XP030116953, 5 pp.
Zou, et al., "Non-SCCE3: Copy from previous row mode for palette coding ," JCT-VC Meeting; Jun. 3-Jul. 9, 2014; Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-R0282-v4, XP030116495, 3 pp.
Zou, et al., "Non-SCCE4: Constrained Run for 1D Dictionary Coding," JCT-VC Meeting; Jun. 30-Jul. 9, 2014; Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-R0225, XP030116525, 4 pp.
Joshi, et al., "High Efficiency Video Coding (HEVC) Screen Content Coding: Draft 3", 20th Meeting, Feb. 10-17, 2015, Geneva, CH (Joint Collaborative Team on Video Coding of ITU-T SG 16 WP 3 and ISO/IEC JTC1/ SC29/WG11) URL: http://wftp3.1tu.int/av-arch/jctvc-site/, No. JCTVC-T1005, Apr. 5, 2015, 565 pp. [uploaded in parts].
Onno, et al., "JCTVC-R0348: Suggested combined software and text for run-based palette mode," 18th Meeting, Jun. 30-Jul. 9, 2014, Sapporo, JP; (Joint Collaborative Team on Video Coding (JCT-VC) of ITU-T SG 16 WP 3 and ISO/ EC JTC 1/SC 29/WG 11); JCTVC-R0348, Jul. 9, 2014, 12 pp.
Office Action from U.S. Appl. No. 14/328,502, dated Jul. 22, 2016, 15 pp.
Office Action from U.S. Appl. No. 14/244,711, dated Aug. 25, 2016, 11 pp.
Flynn, et al., "High Efficiency Video Coding (HEVC) Range Extensions text specification: Draft 7," JCT-VC meeting, MPEG meeting; Mar. 27-Apr. 14, 2014; Incheon, KR; (Joint Collaborative Team on Video Coding of ISO/IEC JTC1/SC29/WG11 and ITU-T SG.16); Document: JCTVC-Q1005_v4, 376 pp. [uploaded in parts].
Guo, et al., "Evaluation of Palette Mode Coding on HM-12.0+RExt-4.1", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0218-v3, Oct. 23, 2013, XP030115268, 7 pp.
Guo, et al., "AHG8: Major-Color-Based Screen Content Coding", JCT-VC Meeting; Oct. 23-Nov. 1, 2013 Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-00182-v3, Oct. 25, 2013, XP030115219, 10 pp.

(56) References Cited

OTHER PUBLICATIONS

Lin, et al., "Compound Image Compression for Real-Time Computer Screen Image Transmission", IEEE Transactions on Image Processing, IEEE Service Center, Piscataway, NJ, US, vol. 14, No. 8, Aug. 1, 2005, pp. 993-1005, XP011136219, ISSN: 1057-7149.
Islam, et al., "A new image compression scheme using repeat reduction and arithmetic coding", Computers andInformation Technology, 2009, ICCIT '09, 12th International Conference on, IEEE, Piscataway, NJ, USA, Dec. 21, 2009, pp. 209-214, XP031624511.
Lan et al., "Screen content coding," 2nd Meeting, Jul. 21-28, 2010, Geneva, CH (Joint Collaborative Team on Video Coding of ISO/IEC JTC1/SC29/WG11 and ITU-T SG.16), Document: JCTVC-B084_r1, 10 pp.
Zou et al., "Non-SCCE3: Copy from previous row mode for palette coding," JCT-VC Meeting; Jun. 30-Jul. 9, 2014 Joint Collaborative Team on Video Coding of ISO/IEC JTC1/SC29/WG11 and ITU-T SG.16 ); No. JCTVC-R0202, Jun. 21, 2014; 4 pp.
Laroche et al., "Non-RCE4: Palette Prediction for Palette mode," 16th Meeting, JCT-VC Meeting; Jan. 9-17, 2014; San Jose, CA, USA (Joint Collaborative Team on Video Coding of ISO/IEC JTC1/SC29/WG11 and ITU-TSG.16 ); URL: htip://wftp3.1tu.int/av-arch/jctvc-site/, No. JCTVC-P0114, Jan. 10, 2014; 6 pp.
Pu, et al., "Non-RCE4: Refinement of the palette in RCE4 Test 2", JCT-VC Meeting; Jan. 9-17, 2014; San Jose; (Joint Collaborative Team on Video Coding of ISO/IEC JTC1/SC29/WG11 and ITU-T SG.I6); URL: htip://wftp3.1tu.int/av-arch/jctvc-site/, No. JCTVC-P0231-v5, Jan. 12, 2014, XP030115774, 4 pp.
Zhang et al., "AHG7: An efficient coding method for DLT in 3D-HEVC," 5th Meeting, JCT-3V Meeting; Jul. 27-Aug. 2, 2013; Vienna, AT (The Joint Collaborative Team on 3D Video Coding Extension Development of ISO/IEC JTC1/SC29/WG11 and ITU-T SG.16); URL: htip://phenix.int-evry.frijct21, No. CT3V-E0176, Jul. 27, 2013; XP030131209, 5 pp.
Ali M., et al., "Lossless Video Coding Using Lattice Based Distributed Source Coding Techniques," Proceedings of the IEEE International Conference on Video and Signal Based Surveillance, AVSS'06, Nov. 22-24, 2006, 6 pp.
Gao W., et al., "HEVC Range Extensions Core Experiment 2 (RCE2): Intra Prediction for Lossless Coding," Document: JCTVC-L1122r3, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 5 Pages.
International Preliminary Report on Patentability from International Application No. PCT/US2014/046402, The International Bureau of WIPO, dated Oct. 20, 2015, 7 pp.
International Search Report and Written Opinion from International Application No. PCT/US2014/046402—ISA/EPO, dated Jan. 26, 2015, 13 pp.
International Search Report and Written Opinion from International Application No. PCT/US2015/036642, dated Oct. 6, 2015, 16 pp.
Lin T., et al., "AHG8: P2M Based Dual-Coder Extension of HEVC," 12. JCT-VC Meeting; 103. MPEG Meeting; Jan. 14, 2013-Jan. 23, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-L0303, Jan. 8, 2013 (Jan. 8, 2013), XP030113791, 5 pages.
Second Written Opinion from International Application No. PCT/US2014/046402, dated Aug. 18, 2015, 6 pp.
Guo X., et al., "AHG8: Major-Color-Based Screen Content Coding," 15. JCT-VC Meeting; Oct. 23, 2013-Nov. 1, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-O0182-v3, Oct. 25, 2013, 10 pages.
Hao P., et al., "Compound Image Compression for Real-Time Computer Screen Image Transmission," IEEE Transactions on Image Processing, IEEE Service Center, Piscataway, NJ, US, vol. 14, No. 8, Aug. 1, 2005 (Aug. 1, 2005), 13 pages.
International Search Report and Written Opinion from International Application No. PCT/US2015/036707, dated Oct. 6, 2015, 15 pages.
Guo L., et al., "Evaluation of Palette Mode Coding on HM-12.0+ RExt-4.1," 15. JCT-VC Meeting; Oct. 23, 2013-Nov. 1, 2013; Geneva, CH; (Joint Collaborative Team on Video Coding of ISO/IEC JTC1/SC29/WG11 and ITU-T SG.16); URL: http://wftp3.itu.int/av-arch/jctvc-site/,, No. JCTVC-O0218-v3, Oct. 23, 2013, 7 pages.
Zhu W., et al., "Inter Modes for Screen Content Coding", JCTVC-F150, Jul. 2011, pp. 1-9, URL: http://phenix.it-sudparis.eu/jct/doc_end_user/documents/6_Torino/wg11/JCTVC-F150-v2.zip.
Pan Z., et al., "A Low-Complexity Screen Compression Scheme for Interactive Screen Sharing", IEEE Transactions on Circuits and Systems for Video Technology, IEEE Service Center, Piscataway, NJ, US, vol. 23, No. 6, Jun. 1, 2013 (Jun. 1, 2013), pp. 949-960, XP011513107, ISSN: 1051-8215, DOI: 10.1109/TCSVT.2013.2243056, abstract p. 951, paragraph III.A-p. 954, paragraph V; figures 2-5.
Lindner S., et al., "Motion Palette Coding for Video Compression", IEE Electrical and Computer Engineering, May 28, 1997, pp. 375-378.

* cited by examiner

DETERMINING PALETTES IN PALETTE-BASED VIDEO CODING

This application claims the benefit of U.S. Provisional Application No. 61/809,236, filed Apr. 5, 2013 and U.S. Provisional Application No. 61/810,649, filed Apr. 10, 2013, the entire contents of which are each incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

Techniques of this disclosure relate to palette-based video coding. For example, in palette based coding, a video coder (a video encoder or video decoder) may form a so-called "palette" as a table of colors for representing the video data of the particular area (e.g., a given block). Palette-based coding may be especially useful for coding areas of video data having a relatively small number of colors. Rather than coding actual pixel values (or their residuals), the video coder may code index values for one or more of the pixels that relate the pixels with entries in the palette representing the colors of the pixels. A palette may be explicitly encoded and sent to the decoder, predicted from previous palette entries, or a combination thereof. The techniques described in this disclosure may include techniques for various combinations of one or more of signaling palette-based coding modes, coding palettes, predicting palettes, deriving palettes, and coding palette-based coding maps and other syntax elements.

In one example, a method of coding video data includes determining a first palette having first entries indicating first pixel values, determining, based on the first entries of the first palette, one or more second entries indicating second pixel values of a second palette, and coding pixels of a block of video data using the second palette.

In another example, an apparatus for coding video data includes a memory storing video data, and one or more processors configured to determine a first palette having first entries indicating first pixel values, determine based on the first entries of the first palette, one or more second entries indicating second pixel values of a second palette, and code pixels of a block of the video data using the second palette.

In another example, an apparatus for coding video data includes means for determining a first palette having first entries indicating first pixel values, means for determining, based on the first entries of the first palette, one or more second entries indicating second pixel values of a second palette, and means for coding pixels of a block of video data using the second palette.

In another example, a non-transitory computer-readable medium stores instructions thereon that, when executed, cause one or more processors to determine a first palette having first entries indicating first pixel values, determine based on the first entries of the first palette, one or more second entries indicating second pixel values of a second palette, and code pixels of a block of the video data using the second palette.

In another example, a method of coding video data includes determining a first index value associated with a first pixel in a block of video data, wherein the first index value relates a position of the first pixel to an entry of a palette of pixel values, determining, based on the first index value, one or more second index values associated with one or more second pixels in the block of video data, wherein the second index values relate the positions of the one or more second pixels to one or more entries of the palette of pixel values, and coding the first pixel and the one or more second pixels of the block of video data.

In another example, an apparatus for coding video data includes a memory storing video data, and one or more processors configured to determine a first index value associated with a first pixel in a block of the video data, wherein the first index value relates a position of the first pixel to an entry of a palette of pixel values, determine, based on the first index value, one or more second index values associated with one or more second pixels in the block of video data, wherein the second index values relate the positions of the one or more second pixels to one or more entries of the palette of pixel values, and code the first pixel and the one or more second pixels of the block of video data.

In another example, an apparatus for coding video data includes means for determining a first index value associated with a first pixel in a block of video data, wherein the first index value relates a position of the first pixel to an entry of a palette of pixel values, means for determining, based on the first index value, one or more second index values associated with one or more second pixels in the block of video data, wherein the second index values relate the positions of the one or more second pixels to one or more entries of the palette of pixel values, and means for coding the first pixel and the one or more second pixels of the block of video data.

In another example, a non-transitory computer-readable medium stores instructions thereon that, when executed, cause one or more processors to determine a first index value associated with a first pixel in a block of the video data, wherein the first index value relates a position of the first pixel to an entry of a palette of pixel values, determine, based on the first index value, one or more second index values associated with one or more second pixels in the block of video data, wherein the second index values relate the positions of the one or more second pixels to one or more entries of the palette of pixel values, and code the first pixel and the one or more second pixels of the block of video data.

The details of one or more examples of the disclosure are set forth in the accompanying drawings and the description below. Other features, objects, and advantages will be apparent from the description, drawings, and claims.

DETAILED DESCRIPTION

Figure 1:
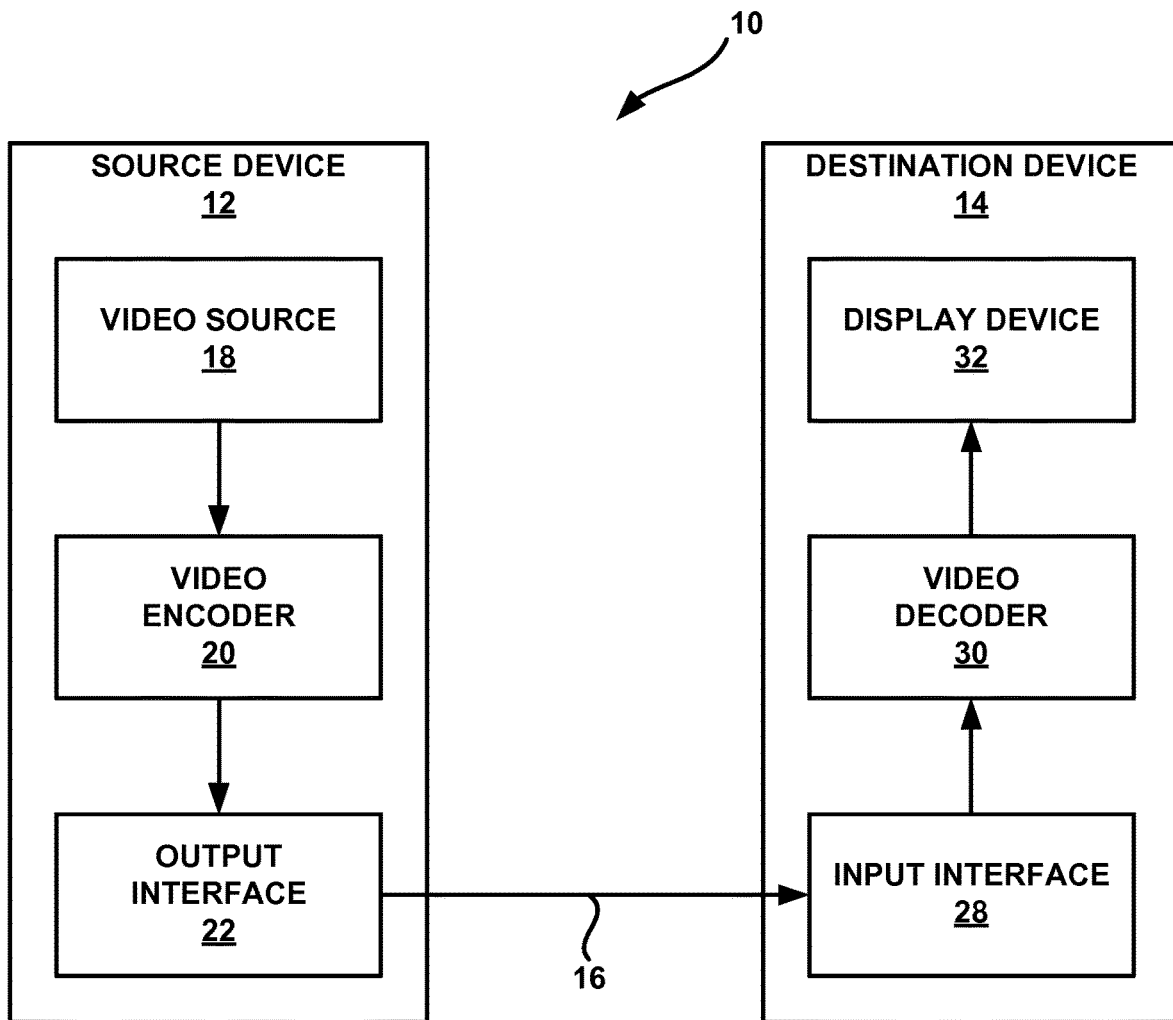
FIG. 1 is a block diagram illustrating an example video coding system that may utilize the techniques described in this disclosure.

This disclosure includes techniques for video coding and compression. In particular, this disclosure describes techniques for palette-based coding of video data. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content (e.g., such as text or computer graphics) may be the dominant content to be compressed. This type of content tends to have discrete-tone and feature sharp lines, and high contrast object boundaries. The assumption of continuous-tone and smoothness may no longer apply for screen content, and thus traditional video coding techniques may not be efficient ways to compress video data including screen content.

This disclosure describes palette-based coding, which may be particularly suitable for screen generated content coding. For example, assuming a particular area of video data has a relatively small number of colors. A video coder (a video encoder or video decoder) may form a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block (e.g., coding the palette explicitly, predicting it, or a combination thereof), locating an entry in the palette to represent the value of each pixel, and encoding the block with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, 12$^{th}$ Meeting of JCT-VC of ITU-T SG16 WP 3 and ISO/IEC JCT 1/SC 29/WG 11, 14-23 Jan. 2013 ("HEVC Draft 10"), available from: http://phenix.int-evry.fr/jct/doc_end_user/documents/12_Geneva/wg11/JCTVC-L1003-v13.zip.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CU's) or prediction units (PU's) in an HEVC codec is described for purposes of example.

In HEVC and other video coding standards, a video sequence typically includes a series of pictures. Pictures may also be referred to as "frames." A picture may include three sample arrays, denoted $S_L$, $S_{cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

Palette-based coding may have a certain amount of signaling overhead. For example, a number of bits may be needed to signal characteristics of a palette, such as a size of the palette, as well as the palette itself. In addition, a number of bits may be needed to signal index values for the pixels of the block. The techniques of this disclosure may, in some examples, reduce the number of bits needed to signal such information. For example, the techniques described in this disclosure may include techniques for various combinations of one or more of signaling palette-based coding modes, transmitting palettes, predicting palettes, deriving palettes, and transmitting palette-based coding maps and other syntax elements.

Aspects of this disclosure are directed to palette prediction. For example, according to aspects of this disclosure, video encoder 20 and/or video decoder 30 may determine a first palette having first entries indicating first pixel values. Video encoder 20 and/or video decoder 30 may then determine, based on the first entries of the first palette, one or more second entries indicating second pixel values of a second palette. Video encoder 20 and/or video decoder 30 may also code pixels of a block of video data using the second palette.

When determining the second entries of the second palette based on the first entries, video encoder 20 may encode a variety of syntax elements, which may be used by video decoder to reconstruct the second palette. For example, video encoder 20 may encode one or more syntax elements in a bitstream to indicate that an entire palette (or palettes, in the case of each color component, e.g., Y, Cb, Cr, or Y, U, V, or R, G, B, of the video data having a separate palette) is copied from one or more neighboring blocks of the block currently being coded. The palette from which entries of the current palette of the current block are predicted (e.g., copied) may be referred to as a predictive palette. The predictive palette may contain palette entries from one or more neighboring blocks including spatially neighboring blocks and/or neighboring blocks in a particular scan order of the blocks. For example, the neighboring blocks may be spatially located to the left (left neighboring block) of or above (upper neighboring block) the block currently being coded. In another example, video encoder 20 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Video encoder 20 may encode one or more syntax elements to indicate the location of the neighboring blocks from which the palette(s) are copied.

In some examples, palette prediction may be performed entry-wise. For example, video encoder 20 may encode one or more syntax elements to indicate, for each entry of a predictive palette, whether the palette entry is included in the palette for the current block. If video encoder 20 does not predict an entry of the palette for the current block, video encoder 20 may encode one or more additional syntax elements to specify the non-predicted entries, as well as the number of such entries.

In some examples, techniques for predicting an entire palette may be combined with techniques for predicting one or more entries of a palette. For example, video encoder 20 may encode one or more syntax elements in a bitstream to indicate whether the current palette is entirely copied from the predictive palette. If this is not the case, video encoder 20 may encode one or more syntax elements in a bitstream to indicate whether each entry in the predictive palette is copied.

In another example, instead of signaling the number of entries and the palette value, video encoder 20 may signal, after signaling each palette value, a flag to indicate whether the signaled palette value is the final palette entry for the palette. Video encoder 20 may not signal such an "end of palette" flag if the palette has already reached a certain maximum size.

According to aspects of this disclosure, video encoder 20 may encode one or more syntax elements to indicate whether palette prediction is enabled and/or active. In an example for purposes of illustration, video encoder 20 may encode a pred_palette_flag to indicate, for each block (e.g., CU or PU), whether video encoder 20 uses palette prediction to predict the palette for the respective block. In some examples, video encoder may signal a separate flag for each color component (e.g., three flags for each block). In other examples, video encoder 20 may signal a single flag that is applicable to all color components of a block.

Video decoder 30 may obtain the above-identified information from an encoded bitstream and use the data to reconstruct the palette. For example, video decoder 30 may receive data indicating whether a particular palette is predicted from another palette, as well as information that allows video decoder 30 to use the appropriate predictive palette entries.

In some instances, additionally or alternatively, video encoder 20 and/or video decoder 30 may construct a palette on-the-fly, i.e., dynamically. For example, video encoder 20 and/or video decoder 30 may add entries to an empty palette during coding. That is, video encoder 20 may add pixel values to a palette as the pixel values are generated and transmitted for positions in a block. Pixels that are coded relatively later in the block may refer to earlier added entries of the palette, e.g., with index values, instead of transmitting the pixel values. Likewise, upon receiving a new pixel value for a position in a block, video decoder 30 may follow the same process as video encoder 20 and include the pixel value in a palette. In this way, video decoder 30 constructs the same palette as video encoder 20. Video decoder 30 may receive, for pixels having values that are already included in the palette, index values that identify the values. Video decoder 30 may use the received information, e.g., pixel values for the palette and index values, to reconstruct the pixels of a block.

In some instances, video encoder 20 and video decoder 30 may maintain a palette of a fixed size. For example, video encoder 20 and video decoder 30 may add the most recent reconstructed pixel values the palette as are reconstructed. For each entry that is added to the palette, the entry that was added to the palette the earliest is discarded. This is also sometimes referred to as First-in-First-out (FIFO). This process of updating the palette may be applied only to blocks that are coded using the palette mode or to all the blocks irrespective of the coding mode.

The techniques described above generally relate to video encoder 20 and video decoder 30 constructing and/or transmitting a palette for palette-based coding. Other aspects of this disclosure relate to constructing and/or transmitting a map that allows video encoder 20 and/or video decoder 30 to determine pixel values. For example, other aspects of this disclosure relate constructing and/or transmitting a map of indices that relate a particular pixel to an entry of a palette.

In some examples, video encoder 20 may indicate whether pixels of a block have a corresponding value in a palette. In an example for purposes of illustration, assume that an (i, j) entry of a map corresponds to an (i, j) pixel position in a block of video data. In this example, video encoder 20 may encode a flag for each pixel position of a block. Video encoder 20 may set the flag equal to one for the (i, j) entry to indicate that the pixel value at the (i, j) location is one of the values in the palette. When a color is included in the palette (i.e., the flag is equal to one) video encoder 20 may also encode data indicating a palette index for the (i, j) entry that identifies the color in the palette. When the color of the pixel is not included in the palette (i.e., the flag is equal to zero) video encoder 20 may also encode data indicating a sample value for the pixel. Video decoder 30 may obtain the above-described data from an encoded bitstream and use the data to determine a palette index and/or pixel value for a particular location in a block.

In some instances, there may be a correlation between the palette index to which a pixel at a given position is mapped and the probability of a neighboring pixel being mapped to the same palette index. That is, when a pixel is mapped to a particular palette index, the probability may be relatively high that one or more neighboring pixels (in terms of spatial location) are mapped to the same palette index.

According to aspects of this disclosure, video encoder 20 and/or video decoder 30 may determine and code one or more indices of a block of video data relative to one or more indices of the same block of video data. For example, video encoder 20 and/or video decoder 30 may be configured to determine a first index value associated with a first pixel in a block of video data, where the first index value relates a value of the first pixel to an entry of a palette. Video encoder 20 and/or video decoder 30 may also be configured to determine, based on the first index value, one or more second index values associated with one or more second pixels in the block of video data, and to code the first and the one or more second pixels of the block of video data. Thus, in this example, indices of a map may be coded relative to one or more other indices of the map.

In some examples, video encoder 20 may encode one or more syntax elements indicating a number of consecutive pixels in a given scan order that are mapped to the same index value. The string of like-valued index values may be referred to herein as a "run." In some examples, a pixel value may be associated with exactly one index value in a palette. Accordingly, in some instances, a run of values may also refer to a string of like-valued pixel values. In other examples, as described with respect to lossy coding below, more than one pixel value may map to the same index value in a palette. In such examples, a run of values refers to like-valued index values.

In an example for purposes of illustration, if two consecutive indices in a given scan order have different values, the run is equal to zero. If two consecutive indices in a given scan order have the same value but the third index in the scan order has a different value, the run is equal to one. Video decoder 30 may obtain the syntax elements indicating a run from an encoded bitstream and use the data to determine the number of consecutive pixel locations that have the same index value.

Additionally or alternatively, according to aspects of this disclosure, video encoder 20 and video decoder 30 may perform line copying for one or more entries of a map. The entries may also be referred to as "positions" due to the relationship between entries of the map and pixel positions of a block. The line copying may depend, in some examples, on the scan direction. For example, video encoder 20 may indicate that a pixel value or index map value for a particular position in a block is equal to the pixel or index value in a line above the particular position (for a horizontal scan) or the column to the left of the particular position (for a vertical scan). Video encoder 20 may also indicate, as a run, the number of pixel values or indices in the scan order that are equal to the corresponding pixel values or indices above or the column to the left of the particular position. In this example, video encoder 20 and or video decoder 30 may copy pixel or index values from the specified neighboring line and from the specified number of entries for the line of the block currently being coded.

In some instances, the line from which values are copied may be directly adjacent to, e.g., above or to the left of, the line of the position currently being coded. In other examples, a number of lines of the block may be buffered by video encoder 20 and/or video decoder 30, such that any of the number of lines of the map may be used as predictive values for a line of the map currently being coded. In an example for purposes of illustration, video encoder 20 and/or video decoder 30 may be configured to store the previous four rows of indices or pixel values prior to coding the current row of pixels. In this example, the predictive row (the row from which indices or pixel values are copied) may be indicated in a bitstream with a truncated unary code or other codes such as unary codes. With respect to a truncated unary code, video encoder 20 and/or video decoder 30 may determine a maximum value for the truncated unary code based on a maximum row calculation (e.g., row_index-1) or a maximum column calculation (e.g., column_index-1). In addition, an indication of the number of positions from the predictive row that are copied may also be included in the bitstream. In some instances, if the line or column from which a current position is being predicted belongs to another block (e.g., CU or CTU) such prediction may be disabled.

According to aspects of this disclosure, the techniques for coding so-called runs of entries may be used in conjunction with the techniques for line copying described above. For example, video encoder 20 may encode one or more syntax elements (e.g., a flag) indicating whether the value of an entry in a map is obtained from a palette or the value of an entry in the map is obtained from a previously coded line in the map. Video encoder 20 may also encode one or more syntax elements indicating an index value of a palette or the location of the entry in the line (the row or column). Video encoder 20 may also encode one or more syntax elements indicating a number of consecutive entries that share the same value. Video decoder 30 may obtain such information from an encoded bitstream and use the information to reconstruct the map and pixel values for a block.

As noted above, the indices of a map are scanned in a particular order. According to aspects of this disclosure, the scan direction may be vertical, horizontal, or at a diagonal (e.g., 45 degrees or 135 degrees diagonally in block). In some examples, video encoder 20 may encode one or more syntax elements for each block indicating a scan direction for scanning the indices of the block. Additionally or alternatively, the scan direction may be signaled or inferred based on so-called side information such as, for example, block size, color space, and/or color component. Video encoder 20 may specify scans for each color component of a block. Alternatively, a specified scan may apply to all color components of a block.

The techniques of this disclosure also include other aspects of palette-based coding. For example, according to aspects of this disclosure, video encoder 20 and/or video decoder 30 may code one or more syntax elements for each block to indicate that the block is coded using a palette coding mode. For example, video encoder 20 and/or video decoder 30 may code a palette mode flag (PLT_Mode_flag)

to indicate whether a palette-based coding mode is to be used for coding a particular block. In this example, video encoder 20 may encode a PLT_Mode_flag that is equal to one to specify that the block currently being encoded ("current block") is encoded using a palette mode. A value of the PLT_Mode_flag equal to zero specifies that the current block is not encoded using palette mode. In this case, video decoder 30 may obtain the PLT_Mode_flag from the encoded bitstream and apply the palette-based coding mode to decode the block. In instances in which there is more than one palette-based coding mode available (e.g., there is more than one palette-based technique available for coding) one or more syntax elements may indicate one of a plurality of different palette modes for the block.

In some instances, video encoder 20 may encode a PLT_Mode_flag that is equal to zero to specify that the current block is not encoded using a palette mode. In such instances, video encoder 20 may encode the block using any of a variety of inter-predictive, intra-predictive, or other coding modes. When the PLT_Mode_flag is equal to zero, video encoder 20 may transmit additional information (e.g., syntax elements) to indicate the specific mode that is used for encoding the respective block. In some examples, as described below, the mode may be an HEVC coding mode. The use of the PLT_Mode_flag is described for purposes of example. In other examples, other syntax elements such as multi-bit codes may be used to indicate whether the palette-based coding mode is to be used for one or more blocks, or to indicate which of a plurality of modes are to be used.

When a palette-based coding mode is used, a palette is transmitted by video encoder 20, e.g., using one or more of the techniques described herein, in the encoded video data bitstream for use by video decoder 30. A palette may be transmitted for each block or may be shared among a number of blocks. The palette may refer to a number of pixel values that are dominant and/or representative for the block.

According to aspects of this disclosure, the size of the palette, e.g., in terms of the number of pixel values that are included in the palette, may be fixed or may be signaled using one or more syntax elements in an encoded bitstream. As described in greater detail below, a pixel value may be composed of a number of samples, e.g., depending on the color space used for coding. For example, a pixel value may include luma and chrominance samples (e.g., luma, U chrominance and V chrominance (YUV) or luma, Cb chrominance, and Cr chrominance (YCbCr) samples). In another example, a pixel value may include Red, Green, and Blue (RGB) samples. As described herein, the term pixel value may generally refer to one or more of the samples contributing to a pixel. That is, the term pixel value does not necessarily refer to all samples contributing to a pixel, and may be used to describe a single sample value contributing to a pixel.

According to aspects of this disclosure, a palette may be transmitted separately for each color component of a particular block. For example, in the YUV color space, there may be a palette for the Y component (representing Y values), another palette for the U component (representing U values), and yet another palette for the V component (representing V values). In another example, a palette may include all components of a particular block. In this example, the i-th entry in the palette may include three values (e.g., Yi, Ui, Vi). According to aspects of this disclosure, one or more syntax elements may separately indicate the size of the palette for each component (e.g., Y, U, V, or the like). In other examples, a single size may be used for all components, such that one or more syntax elements indicate the size of all components.

According to aspects of this disclosure, video encoder 20 and/or video decoder may perform palette-based coding in a lossy or lossless manner. That is, in some examples, video encoder 20 and/or video decoder 30 may losslessly code video data for a block using palette entries that match the pixel values of the block (or by sending the actual pixel values if the pixel value is not included in the palette). In other examples, as described in greater detail with respect to FIG. 5 below, video encoder 20 and/or video decoder 30 may code video data for a block using palette entries that do not exactly match the pixel values of the block (lossy coding).

In some examples, the techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

Figure 2:
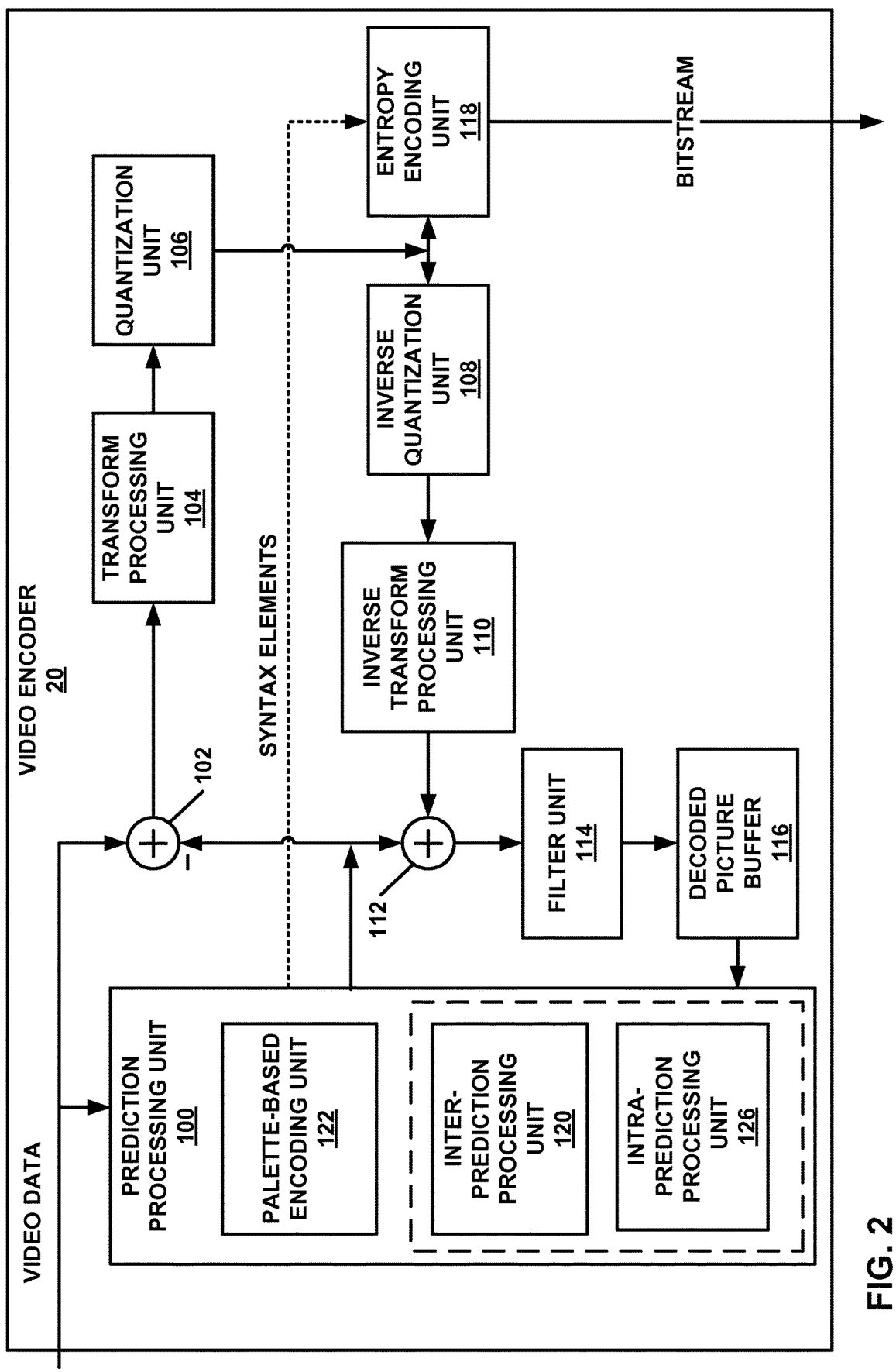
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may be configured to generate any of the various syntax elements described herein. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

Figure 3:
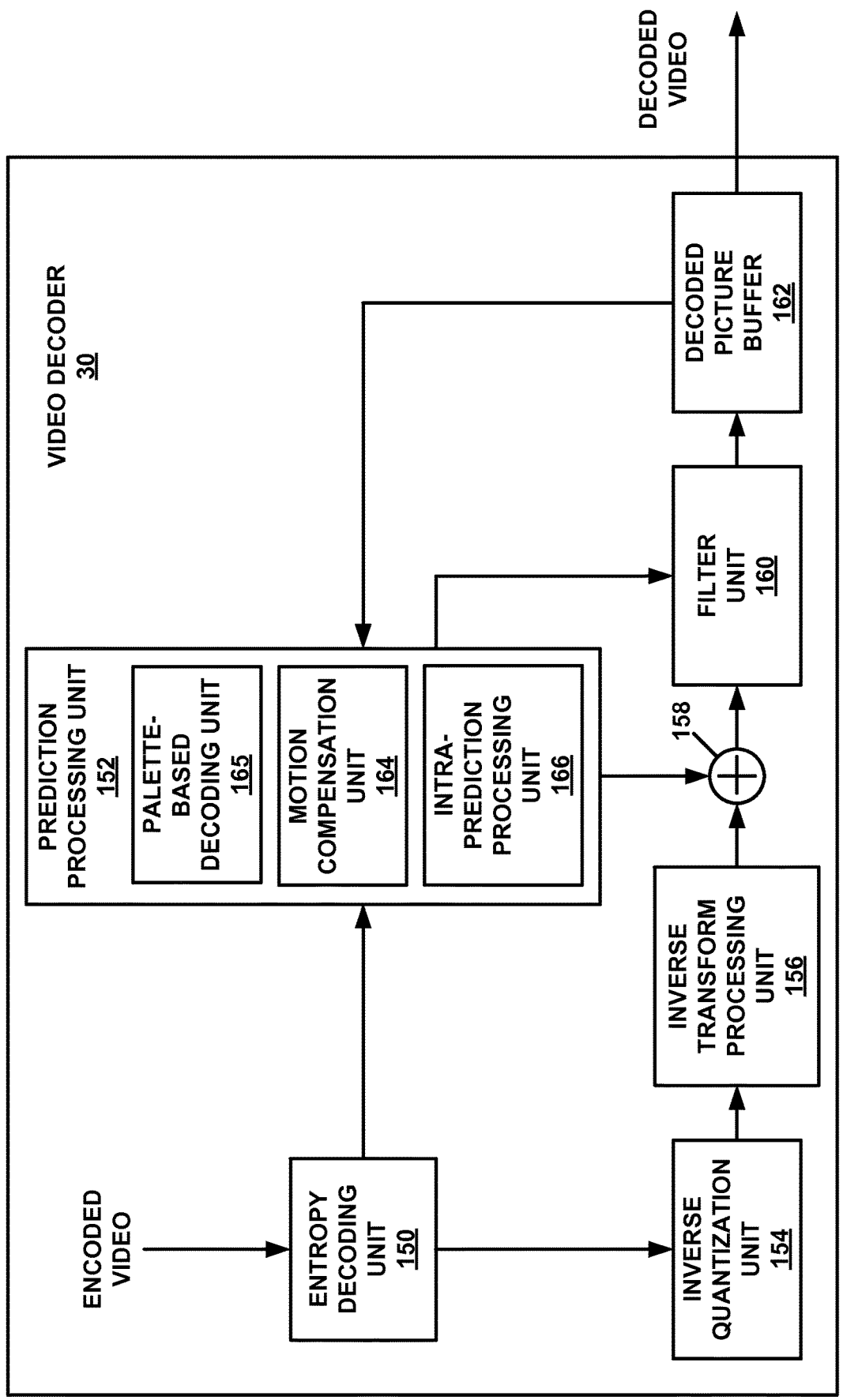
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

The palette coding mode information received by palette-based decoding unit 165 may comprise a palette mode syntax element, such as a flag. A first value of the palette mode syntax element indicates that the palette coding mode applies to the block and a second value of the palette mode syntax element indicates that the palette coding mode does not apply to the block of video data. Palette-based decoding unit 165 may receive (e.g., from video encoder 20) the palette coding mode information at one or more of a predictive unit level, a coding unit level, a slice level, or a picture level, or may receive an indication of whether palette coding mode is enabled in at least one of picture parameter set (PPS), sequence parameter set (SPS) or video parameter set (VPS).

In some examples, palette-based decoding unit 165 may infer the palette coding mode information based on one or more of a size of the coding block, a frame type, a color space, a color component, a frame size, a frame rate, a layer id in scalable video coding or a view id in multi-view coding associated with the block of video data.

Palette-based decoding unit 165 also may be configured to receive information defining at least some of the entries in the palette with video data, and generate the palette based at least in part on the received information. The size of the palette may be fixed or variable. In some cases, the size of the palette is variable and is adjustable based on information signaled with the video data. The signaled information may specify whether an entry in the palette is a last entry in the palette. Also, in some cases, the palette may have a maximum size. The size of the palette may also be conditionally transmitted or inferred. The conditions may be the size of the CU, the frame type, the color space, the color component, the frame size, the frame rate, the layer id in scalable video coding or the view id in multi-view coding.

The palette may be a single palette including entries indicating pixel values for a luma component and chroma components of the block. In this case, each entry in the palette is a triple entry indicating pixel values for the luma component and two chroma components. Alternatively, the palette includes a luma palette including entries indicating pixel values of a luma component of the block, and chroma palettes including entries indicating pixel values for respective chroma components of the block.

In some examples, palette-based decoding unit 165 may generate the palette by predicting the entries in the palette based on previously processed data. The previously processed data may include palettes, or information from palettes, for previously decoded neighboring blocks. Palette-based decoding unit 165 may receive a prediction syntax element indicating whether the entries in the palette are to be predicted. The prediction syntax element may include a plurality of prediction syntax elements indicating, respectively, whether entries in palettes for luma and chroma components are to be predicted.

With respect to a predictive palette, for example, a predictive palette may contain palette entries from one or more neighboring blocks including spatially neighboring blocks and/or neighboring blocks in a particular scan order of the blocks. In an example, the neighboring blocks may be spatially located to the left (left neighboring block) of or above (upper neighboring block) the block currently being coded. In another example, palette-based decoding unit 165 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Palette-based decoding unit 165 may decode one or more syntax elements to indicate the location of the neighboring blocks from which the palette(s) are copied.

Thus, in an example, palette-based decoding unit 165 may, in some examples, predict at least some of the entries in the palette based on entries in a palette for a left neighbor block or a top neighbor block in a slice or picture. In this case, the entries in the palette that are predicted based on entries in either a palette for the left neighbor block or the top neighbor block may be predicted by palette-based decoding unit 165 based on a syntax element that indicates selection of the left neighbor block or the top neighbor block for prediction. The syntax element may be a flag having a value that indicates selection of the left neighbor block or the top neighbor block for prediction.

In some examples, palette-based decoding unit 165 may receive one or more prediction syntax elements that indicate whether at least some selected entries in the palette, on an entry-by-entry basis, are to be predicted, and generate the entries accordingly. For example, palette-based decoding unit 165 may decode one or more syntax elements to indicate, for each entry of a predictive palette, whether the palette entry is included in the palette for the current block. If an entry is not predicted, palette-based decoding unit 165 may decode one or more additional syntax elements to specify the non-predicted entries, as well as the number of such entries. Thus, palette-based decoding unit 165 may predict some of the entries and receive information directly specifying other entries in the palette including the number of additional entries.

In some examples, techniques for predicting an entire palette may be combined with techniques for predicting one or more entries of a palette. For example, palette-based decoding unit 165 may decode one or more syntax elements in a bitstream to indicate whether the current palette is entirely copied from the predictive palette. If this is not the case, palette-based decoding unit 165 may decode one or more syntax elements in a bitstream to indicate whether each entry in the predictive palette is copied.

In another example, instead of receiving the number of entries and the palette value, palette-based decoding unit 165 may receive, after each palette value, a flag to indicate whether the signaled palette value is the final palette entry for the palette. Palette-based decoding unit 165 may not receive such an "end of palette" flag if the palette has already reached a certain maximum size.

Information, received by palette-based decoding unit 165, associating at least some positions of a block of video data with entries in the palette may comprise map information including palette index values for at least some of the positions in the block, wherein each of the palette index values corresponds to one of the entries in the palette. The map information may include one or more run syntax elements that each indicates a number of consecutive positions in the block having the same palette index value.

In some examples, palette-based decoding unit 165 may receive information indicating line copying whereby pixel or index values for a line of positions in the block are copied from pixel or index values for another line of positions in the block. Palette-based decoding unit 165 may use this information to perform line copying to determine pixel values or entries in the palette for various positions of a block. The line of positions may comprise a row, a portion of a row, a column or a portion of a column of positions of the block.

Palette-based decoding unit 165 may generate the palette in part by receiving pixel values for one or more positions of the block, and adding the pixel values to entries in the palette to dynamically generate at least a portion the palette on-the-fly. Adding the pixel values may comprise adding the pixel values to an initial palette comprising an initial set of entries, or to an empty palette that does not include an initial set of entries. In some examples, adding comprises adding the pixel values to add new entries to an initial palette comprising an initial set of entries or fill existing entries in the initial palette, or replacing or changing pixel values of entries in the initial palette.

In some examples, palette-based decoding unit 165 may determine a fixed, maximum size for a palette. Upon reaching the maximum size palette-based decoding unit 165 may remove one or more entries of the palette. In one example, palette-based decoding unit 165 may remove the oldest entry of the palette, e.g., using a FIFO queue. In another example, palette-based decoding unit 165 may remove the least used entry. In still another example, palette-based decoding unit 165 may make a weighted determination regarding which entry to remove based on when a candidate entry to be removed was added to the palette and the relative usage of that entry.

In some examples, the palette may be a quantized palette in which a pixel value selected from the palette for one of the positions in the block is different from an actual pixel value of the position in the block, such that the decoding process is lossy. For example, the same pixel value may be selected from the palette for two different positions having different actual pixel values.

Figure 4:
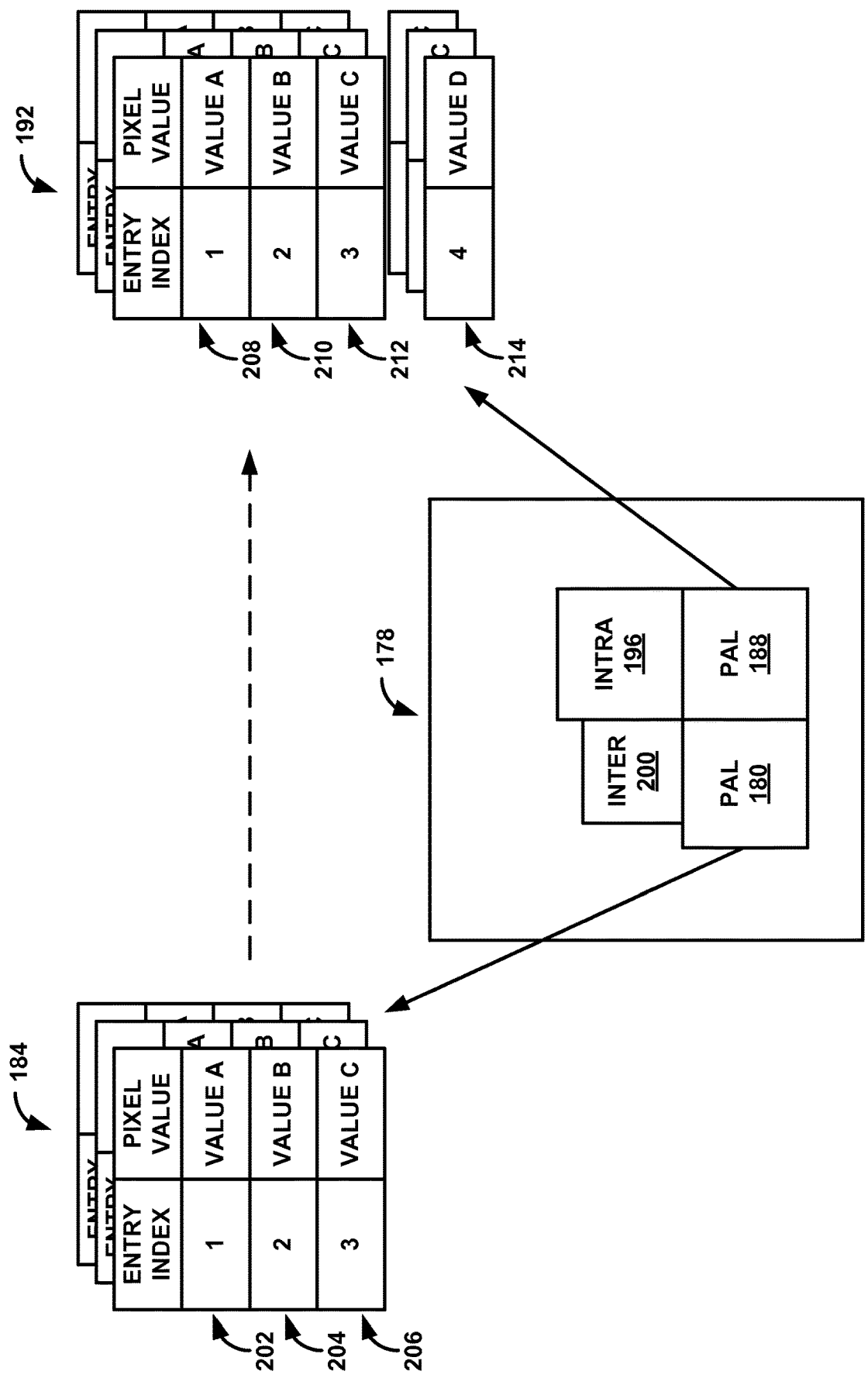
FIG. 4 is a conceptual diagram illustrating an example of determining a palette for coding video data, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding. In general, one or more palettes may be transmitted for each CU or may be shared among different CUs.

According to aspects of this disclosure, video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palette 192 for second CU 188 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is a flag may be signaled for each entry of a palette predictor to indicate whether that entry is present in the current palette. As noted above, if a palette entry is not predicted, the palette entry may be explicitly signaled.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictor palette. In some examples, such as the example illustrated in FIG. 4, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 4 illustrates first palettes 184 as predictive palettes from a single CU, first CU 180, in other examples, video encoder 20 and/or video decoder 30 may locate palettes for prediction from a combination of neighboring CUs. For example, video encoder 20 and/or video decoder may apply one or more formulas, functions, rules or the like to generate a palette based on palettes of one or a combination of a plurality of neighboring CUs.

In still other examples, video encoder 20 and/or video decoder 30 may construct a candidate list including a number of potential candidates for palette prediction. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

As noted above, in some examples, video encoder 20 and/or video decoder may copy an entire palette from a neighboring CU for coding a current CU. Additionally or alternatively, video encoder 20 and/or video decoder 30 may perform entry-wise based palette prediction. For example, video encoder 20 may encode one or more syntax elements for each entry of a palette indicating whether the respective entries are predicted based on a predictive palette (e.g., a palette of another CU). In this example, video encoder 20 may encode a flag having a value equal to one for a given entry when the entry is a predicted value from a predictive palette (e.g., a corresponding entry of a palette associated with a neighboring CU). Video encoder 20 may encode a flag having a value equal to zero for a particular entry to indicate that the particular entry is not predicted from a palette of another CU. In this example, video encoder 20 may also encode additional data indicating the value of the non-predicted palette entry.

In the example of FIG. 4, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. According to aspects of this disclosure, video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictor palette and the pixel values corresponding to those palette entries.

In some examples, according to aspects of this disclosure, one or more syntax elements may indicate whether palettes, such as second palettes 192, are predicted entirely from a predictive palette (shown in FIG. 4 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements) video encoder 20 and video decoder 30 may perform palette prediction based on one or more characteristics of the data being coded.

In an example, for purposes of illustration, the value of pred_palette_flag, described above, may be inferred from one or more of, as examples, the size of the CU being coded, the frame type, the color space, the color component, the frame size, the frame rate, the layer id in scalable video coding or the view id in multi-view coding. That is, with respect to the size of the CU as an example, video encoder 20 and/or video decoder 30 may determine that the above-described pred_palette_flag is equal to one for any CUs that exceed a predetermined size. In this example, the pred_palette_flag does not need to be signaled in the encoded bitstream.

While described above with respect to the pred_palette_flag, video encoder 20 and/or video decoder 30 may also or alternatively infer other information associated with palette prediction, such as the candidate CU from which the palette is used for prediction, or rules for constructing palette prediction candidates, based on one or more characteristics of the data being coded.

According to other aspects of this disclosure, video encoder 20 and/or video decoder 30 may construct a palette on-the-fly. For example, when initially coding second CU 188, there are no entries in palettes 192. As video encoder 20 and video decoder 30 code new values for pixels of second CU 188, each new value is included in palettes 192. That is, for example, video encoder 20 adds pixel values to palettes 192 as the pixel values are generated and signaled for positions in CU 188. As video encoder 20 encodes pixels relatively later in the CU, video encoder 20 may encode pixels having the same values as those already included in the palette using index values rather than signaling the pixel values. Similarly, when video decoder 30 receives a new pixel value (e.g., signaled by video encoder 20) for a position in second CU 188, video decoder 30 includes the pixel value in palettes 192. When pixel positions decoded relatively later in second CU 188 have pixel values that have been added to second palettes 192, video decoder 30 may receive information such as, e.g., index values, that identify the corresponding pixel values in second palettes 192 for reconstruction of the pixel values of second CU 188.

In some examples, as described in greater detail below, video encoder 20 and/or video decoder 30 may maintain palettes 184 and 192 at or below a maximum palette size. According to aspects of this disclosure, if a maximum palette size is reached, e.g., as second palettes 192 are constructed dynamically on-the-fly, then video encoder 20 and/or video decoder 30 perform the same process to remove an entry of second palettes 192. One example process for removing palette entries is a first-in-first-out (FIFO) technique in which video encoder 20 and video decoder 30 remove the oldest entry of a palette. In another example, video encoder 20 and video decoder 30 may remove the least frequently used palette entry from the palette. In still another example, video encoder 20 and video decoder 30 may weight both FIFO and frequency of use processes to determine which entry to remove. That is, removal of an entry may be based on how the old the entry is and how frequently it is used.

According to some aspects, if an entry (pixel value) is removed from a palette and the pixel value occurs again at a later position in the CU being coded, video encoder 20 may encode the pixel value instead of including an entry in the palette and encoding an index. Additionally or alternatively, video encoder 20 may re-enter palette entries into the palette after having been removed, e.g., as video encoder 20 and video decoder 30 scan the positions in the CU.

In some examples, the techniques for deriving a palette on-the-fly may be combined with one or more other techniques for determining a palette. In particular, as an example, video encoder 20 and video decoder 30 may initially code second palettes 192 (e.g., using palette prediction to predict second palettes 192 from first palettes 184) and may update second palettes 192 when coding pixels of second CU 188. For example, upon transmitting the initial palette, video encoder 20 may add values to the initial palette or change values in the initial palette as pixel values of additional locations in the CU are scanned. Likewise, upon receiving an initial palette, video decoder 30 may add values to the initial palette or change values in the initial palette as pixel values of additional locations in the CU are scanned.

Video encoder 20 may, in some examples, signal whether the current CU uses transmission of an entire palette, or on-the-fly palette generation, or a combination of transmission of an initial palette with updating of the initial palette by on-the-fly derivation. In some examples, the initial palette may be a full palette at maximum palette size, in which case values in the initial palette may be changed. In other examples, the initial palette may be smaller than the maximum palette size, in which cases video encoder 20 and video decoder 30 may add values to and/or change values of the initial palette.

According to aspects of this disclosure, the size of palettes, such as first palettes 184 and second palettes 192, e.g., in terms of the number of pixel values that are included in the palette may be fixed or may be signaled using one or more syntax elements in an encoded bitstream. For example, according to some aspects, video encoder 20 and video decoder 30 may use unary codes or truncated unary codes (e.g., codes that truncate at a maximum limit of the palette size) to code the palette size. According to other aspects, video encoder 20 and video decoder 30 may use Exponential-Golomb or Rice-Golomb codes to code the palette size.

According to still other aspects, video encoder 20 and video decoder 30 may code data indicating the size of the palette after each entry of the palette. With respect to second palettes 192 as an example, video encoder 20 may encode a stop flag after each of entries 208-214. In this example, a stop flag equal to one may specify that the entry currently being coded is the final entry of second palettes 192, while a stop flag equal to zero may indicate that there are additional entries in second palettes 192. Accordingly, video encoder 20 may encode stop flags having a value of zero after each of entries 208-212 and a stop flag having a value of one after entry 214. In some instances, the stop flag may not be included in the bitstream upon the constructed palette reaching a maximum palette size limit. While the examples above disclose techniques for explicitly signaling the size of palettes, in other examples, the size of palettes may also be conditionally transmitted or inferred based on so-called side information (e.g., characteristic information such as the size of the CU being coded, the frame type, the color space, the color component, the frame size, the frame rate, the layer id in scalable video coding or the view id in multi-view coding, as noted above).

The techniques of this disclosure include coding data losslessly, or, alternatively, with some losses (lossy coding). For example, with respect to lossy coding, video encoder 20 may code the pixels of a CU without exactly matching the pixel values of palettes exactly to the actual pixel values in the CU. When the techniques of this disclosure are applied to lossy coding, some restrictions may be applied to the palette. For example, video encoder 20 and video decoder 30 may quantize palettes, such as first palettes 184 and second palettes 192. That is, video encoder 20 and video decoder 30 may merge (quantize) entries of a palette when the pixel values of the entries are within a predetermined range of each other. In other words, if there is already a palette value that is within an error margin of a new palette value, the new palette value is not added to the palette. In another example, a plurality of different pixel values in a block may be mapped to a single palette entry, or, equivalently, to a single palette pixel value.

Video decoder 30 may decode pixel values in the same manner, regardless of whether a particular palette is lossless or lossy. As one example, video decoder 30 may use an index value transmitted by video encoder 20 for a given pixel position in a coded block to select an entry in the palette for the pixel position, without regard to whether the palette is lossless or lossy. In this example, the pixel value of the palette entry is used as the pixel value in the coded block, whether it matches the original pixel value exactly or not.

In an example of lossy coding, for purposes of illustration, video encoder 20 may determine an error bound, referred to as a delta value. A candidate pixel value entry Plt_cand may correspond to a pixel value at a position in a block to be coded, such as CU or PU. During construction of the palette, video encoder 20 determines the absolute difference between the candidate pixel value entry Plt_cand and all of the existing pixel value entries in the palette. If all of the absolute differences between the candidate pixel value entry Plt_cand and the existing pixel value entries in the palette are larger than the delta value, video encoder 20 may add the pixel value candidate to the palette as an entry. If an absolute difference between the pixel value entry Plt_cand and at least one existing pixel value entry in the palette is equal to or smaller than the delta value, video encoder 20 may not add the candidate pixel value entry Plt_cand to the palette. Thus, when coding the pixel value entry Plt_cand, video encoder 20 may select the entry with the pixel value that is the closest to the pixel value entry Plt_cand, thereby introducing some loss into the system. When a palette consists of multiple components (e.g. three color components), the sum of absolute difference of individual component values may be used for comparison against the delta value. Alternatively or additionally, the absolute difference for each component value may be compared against a second delta value.

In some examples, the existing pixel value entries in the palette noted above may have been added using a similar delta comparison process. In other examples, the existing pixel values in the palette may have been added using other processes. For example, one or more initial pixel value entries may be added to a palette (without a delta comparison) to start the delta comparison process of constructing the palette. The process described above may be implemented by video encoder 20 and/or video decoder 30 to produce luma and/or chroma palettes.

The techniques described above with respect to palette construction may also be used by video encoder 20 and video decoder 30 during pixel coding. For example, when encoding of a pixel value, video encoder 20 may compare the value of the pixel with the pixel values of entries in the palette. If the absolute pixel value difference between the value of the pixel and one of the entries in the palette is equal to or smaller than a delta value, video encoder 20 may encode the pixel value as the entry of the palette. That is, in this example, video encoder 20 encodes the pixel value using one of the entries of the palette when the pixel value produces a sufficiently small (e.g., within a predetermined range) absolute difference versus the palette entry.

In some examples, video encoder 20 may select the palette entry that yields the smallest absolute pixel value difference (compared to the pixel value being coded) to encode the pixel value. As an example, video encoder 20 may encode an index to indicate a palette entry that will be used for the pixel value, e.g., the palette pixel value entry that will be used to reconstruct the coded pixel value at video decoder 30. If the absolute pixel value difference between the value of the pixel and all of the entries in the palette is greater than delta, the encoder may not use one of the palette entries to encode the pixel value, and instead may transmit the pixel value of the pixel to be coded to video decoder 30 (and possibly add the pixel value as an entry to the palette).

In another example, video encoder 20 may select an entry of a palette for encoding a pixel value. Video encoder 20 may use the selected entry as a predictive pixel value. That is, video encoder 20 may determine a residual value representing a difference between the actual pixel value and the selected entry and encode the residue. Video encoder 20 may generate residual values for pixels in a block that are predicted by entries of a palette, and may generate a residue block including respective residual pixel values for the block of pixels. Video encoder 20 may subsequently apply transformation and quantization (as noted above with respect to FIG. 2) to the residue block. In this manner, video encoder 20 may generate quantized residual transform coefficients.

Video decoder 30 may inverse transform and inverse quantize the transform coefficients to reproduce the residual block. Video decoder 30 may then reconstruct a pixel value using the predictive palette entry value and the residual value for the pixel value. For example, video decoder 30 may combine the residual value with the palette entry value to reconstruct the coded pixel value.

In some examples, the delta value may be different for different CU sizes, picture sizes, color spaces or different color components. The delta value may be predetermined or determined based on various coding conditions. For example, video encoder 20 may signal the delta value to video decoder 30 using high level syntax, such as syntax in PPS, SPS, VPS and/or slice header. In other examples, video encoder 20 and video decoder 30 may be preconfigured to use the same, fixed delta value. In still other examples, video encoder 20 and/or video decoder 30 may adaptively derive the delta value based on side information (e.g., such as CU size, color space, color component, or the like, as noted above).

In some examples, a lossy coding palette mode may be included as an HEVC coding mode. For example, coding modes may include an intra-prediction mode, an inter-prediction mode, a lossless coding palette mode, and a lossy coding palette mode. In HEVC coding, as noted above with respect to FIGS. 2 and 3, a quantization parameter (QP) is used to control the allowed distortion. The value of delta for palette-based coding may be calculated or otherwise determined as a function of QP. For example, the above-described delta value may be 1<<(QP/6) or 1<<((QP+d)/6) where d is a constant, and "<<" represents the bitwise left-shift operator.

Generation of a palette using the lossy coding techniques described in this disclosure may be performed by video encoder 20, video decoder 30 or both. For example, video encoder 20 may generate entries in a palette for a CU using the delta comparison techniques described above and signal information for construction of the palette for use by video decoder 30. That is, video encoder 20 may be configured to signal information indicating pixel values for entries in a palette for a CU, and then encode pixel values using the pixel values associated with such palette entries. Video decoder 30 may construct a palette using such information, and then use the entries to decode pixel values of a coded block. In some examples, video encoder 20 may signal index values that identify palette entries for one or more pixel positions of the coded block, and video decoder 30 may use the index values to retrieve the pertinent pixel value entries from the palette.

In other examples, video decoder 30 may be configured to construct a palette by applying the delta comparison techniques described above. For example, video decoder 30 may receive pixel values for positions within a coded block and determine whether absolute differences between the pixel values and the existing pixel value entries in the palette are larger than a delta value. If so, video decoder 30 may add the pixel values as entries in the palette, e.g., for later use in palette-based decoding of pixel values for other pixel positions of the block using corresponding index values signaled by video encoder 20. In this case, video encoder 20 and video decoder 30 apply the same or similar processes to generate the palette. If not, video decoder 30 may not add the pixel values to the palette.

In an example for purposes of illustration, video decoder 30 may receive index values or pixel values for various pixel positions in a block. If an index value is received for a pixel position, for example, video decoder 30 may use the index value to identify an entry in the palette, and use the pixel value of the palette entry for the pixel position. If a pixel value is received for the pixel position, video decoder 30 may use the received pixel value for the pixel position, and also apply the delta comparison to determine whether the pixel value should be added to the palette and then later used for palette coding.

On the encoder side, if a pixel value for a position in a block produces an absolute difference between the pixel value and an existing pixel value entry in the palette that is less than or equal to the delta value, video encoder 20 may send an index value to identify the entry in the palette for use in reconstructing the pixel value for that position. If a pixel value for a position in a block produces absolute difference values between the pixel value and the existing pixel value entries in the palette that are all greater than the delta value, video encoder 20 may send the pixel value and add the pixel value as a new entry in the palette. To construct the palette, video decoder 30 may use delta values signaled by the encoder, rely on a fixed or known delta value, or infer or derive a delta value, e.g., as described above.

As noted above, video encoder 20 and/or video decoder 30 may use coding modes including an intra-prediction mode, an inter-prediction mode, a lossless coding palette mode, and a lossy coding palette mode when coding video data. According to some aspects of this disclosure, video encoder 20 and video decoder 30 may code one or more syntax elements indicating whether palette-based coding is enabled. For example, at each CU, video encoder 20 may encode a syntax element, such as a flag PLT_Mode_flag. The PLT_Mode_flag or other syntax element may indicate whether a palette-based coding mode is to be used for a given CU (or a PU in other examples). For example, this flag may be signaled in an encoded video bitstream at the CU level, and then received by video decoder 30 upon decoding the encoded video bitstream.

In this example, a value of this PLT_Mode_flag equal to 1 may specify that the current CU is encoded using a palette-based coding mode. In this case, video decoder 30 may apply the palette-based coding mode to decode the CU. In some examples, a syntax element may indicate one of a plurality of different palette-based coding modes for the CU (e.g., lossy or lossless). A value of this PLT_Mode_flag equal to 0 may specify that the current CU is encoded using a mode other than palette mode. For example, any of a variety of inter-predictive, intra-predictive, or other coding modes may be used. When a value of PLT_Mode_flag is 0, video encoder 20 may also encode additional data to indicate the specific mode used for encoding the respective CU (e.g., an HEVC coding mode). The use of the PLT_Mode_flag is described for purposes of example. In other examples, however, other syntax elements such as multi-bit codes may be used to indicate whether the palette-based coding mode is to be used for a CU (or PU in other examples) or to indicate which of a plurality of modes are to be used for coding.

In some examples, the above-described flag or other syntax elements may be transmitted at a higher level than the CU (or PU) level. For example, video encoder 20 may signal such a flag at a slice level. In this case, a value equal to 1 indicates that all of the CUs in the slice are encoded using palette mode. In this example, no additional mode information, e.g., for palette mode or other modes, is signaled at the CU level. In another example, video encoder 20 may signal such a flag in a PPS, SPS or VPS.

According to some aspects of this disclosure, video encoder 20 and/or video decoder 30 may code one or more syntax elements (e.g., such as the above-described flag) at one of the slice, PPS, SPS, or VPS levels specifying whether the palette mode is enabled or disabled for the particular slice, picture, sequence or the like, while the PLT_Mode_flag indicates whether the palette-based coding mode is used for each CU. In this case, if a flag or other syntax element sent at the slice, PPS, SPS or VPS level indicates that palette coding mode is disabled, in some examples, there may be no need to signal the PLT_Mode_flag for each CU. Alternatively, if a flag or other syntax element sent at the slice, PPS, SPS or VPS level indicates that palette coding mode is enabled, the PLT_Mode_flag may be further signaled to indicate whether the palette-based coding mode is to be used for each CU. Again, as mentioned above, application of these techniques for indicating palette-based coding of a CU could additionally or alternatively be used to indicate palette-based coding of a PU.

In some examples, the above-described syntax elements may be conditionally signaled in the bitstream. For example, video encoder 20 and video decoder 30 may only encode or decode, respectively, the syntax elements based on the size of the CU, the frame type, the color space, the color component, the frame size, the frame rate, the layer id in scalable video coding or the view id in multi-view coding.

While the examples described above relate to explicit signaling, e.g., with one or more syntax elements in a bitstream, in other examples, video encoder 20 and/or video decoder 30 may implicitly determine whether a palette coding mode is active and/or used for coding a particular block. Video encoder 20 and video decoder 30 may determine whether palette-based coding is used for a block based on, for example, the size of the CU, the frame type, the color space, the color component, the frame size, the frame rate, the layer id in scalable video coding or the view id in multi-view coding.

While the techniques of FIG. 4 are described above in the context of CUs (HEVC), it should be understood that the techniques may also be applied to prediction units (PUs) or in other video coding processes and/or standards.

Figure 5:
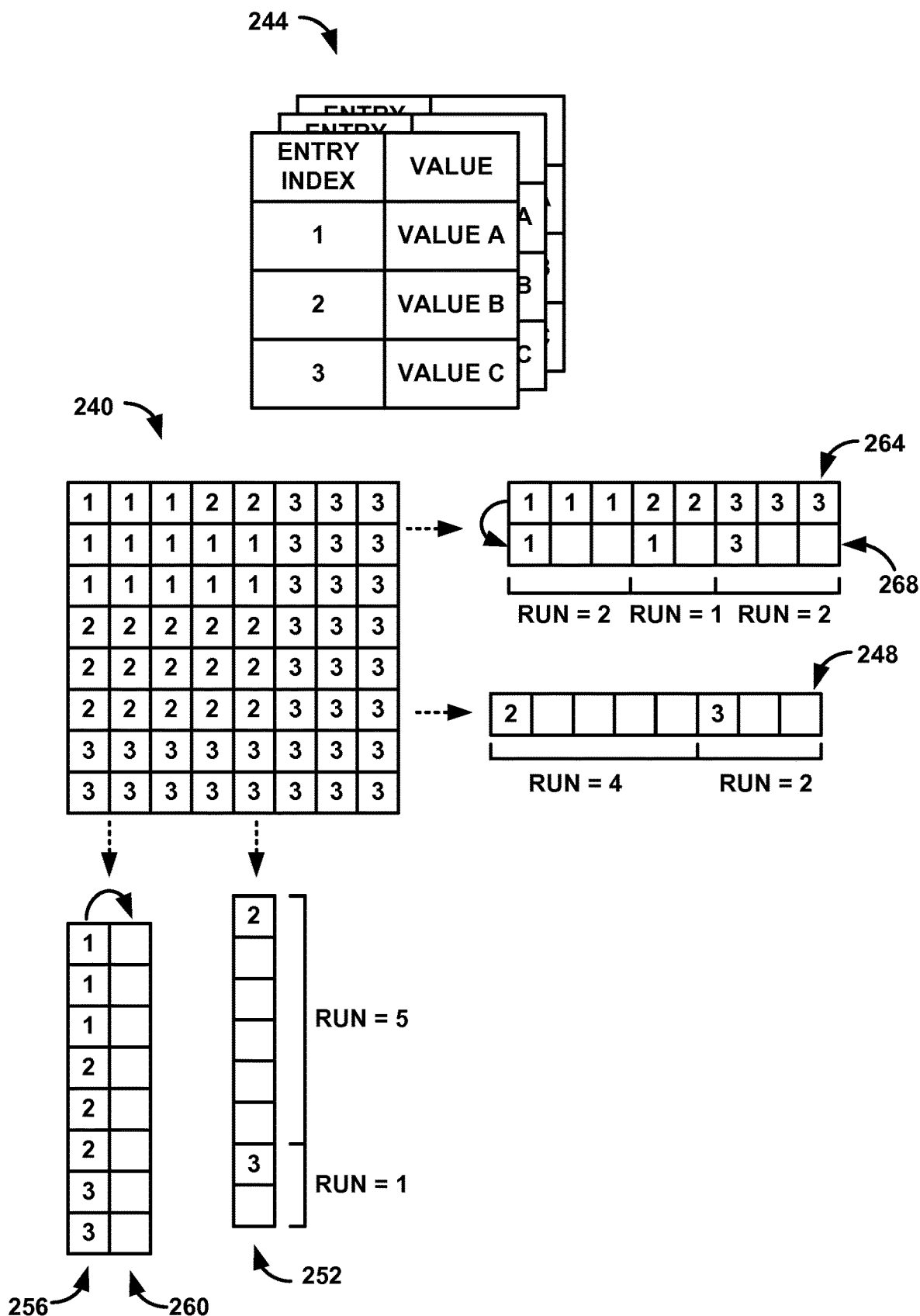
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 4.

Again, the techniques of FIG. 5 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, according to aspects of this disclosure, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

In an example for purposes of illustration, consider line 248 of map 240. Assuming a horizontal, left to right scan direction, line 248 includes five index values of "2" and three index values of "3." According to aspects of this disclosure, video encoder 20 may encode an index value of 2 for the first position of line 248 in the scan direction. In addition, video encoder 20 may encode one or more syntax elements indicating the run of consecutive values in the scan direction that have the same index value as the signaled index value. In the example of line 248, video encoder 20 may signal a run of 4, thereby indicating that the index values of the following four positions in the scan direction share the same index value as the signaled index value. Video encoder 20 may perform the same process for the next different index value in line 248. That is, video encoder 20 may encode an index value of 3 and one or more syntax elements indicating a run of two. Video decoder 30 may obtain the syntax elements indicating the index value and the number of consecutive indices in the scan direction having the same index value (the run).

As noted above, the indices of a map are scanned in a particular order. According to aspects of this disclosure, the scan direction may be vertical, horizontal, or at a diagonal (e.g., 45 degrees or 135 degrees diagonally in block). In some examples, video encoder 20 may encode one or more syntax elements for each block indicating a scan direction for scanning the indices of the block. Additionally or alternatively, the scan direction may be signaled or inferred based on so-called side information such as, for example, block size, color space, and/or color component. Video encoder 20 may specify scans for each color component of a block. Alternatively, a specified scan may apply to all color components of a block.

For example, with respect to a column based scan, consider column 252 of map 240. Assuming a vertical, top to bottom scan direction, column 252 includes six index values of "2" and two index values of "3." According to aspects of this disclosure, video encoder 20 may encode an index value of 2 for the first position of line 252 in the scan direction (at the relative top of column 252). In addition, video encoder 20 may signal a run of 5, thereby indicating that the index values of the following five positions in the scan direction share the same index value as the signaled index value. Video encoder 20 may also encode an index value of 3 for the next position in the scan direction and one or more syntax elements indicating a run of one. Video decoder 30 may obtain the syntax elements indicating the index value and the number of consecutive indices in the scan direction having the same index value (the run).

According to aspects of this disclosure, video encoder 20 and video decoder 30 may additionally or alternatively perform line copying for one or more entries of map 240. The line copying may depend, in some examples, on the scan direction. For example, video encoder 20 may indicate that a pixel or index value for a particular entry in a map is equal to a pixel or index value in a line above the particular entry (for a horizontal scan) or the column to the left of the particular entry (for a vertical scan). Video encoder 20 may also indicate, as a run, the number of pixel or index values in the scan order that are equal to the entry in the line above or the column to the left of the particular entry. In this example, video encoder 20 and or video decoder 30 may copy pixel or index values from the specified neighboring line and from the specified number of entries for the line of the map currently being coded.

In an example for purposes of illustration, consider columns 256 and 260 of map 240. Assuming a vertical, top to bottom scan direction, column 256 includes three index values of "1," three index values of "2," and two index values of "3." Column 260 includes the same index values having the same order in the scan direction. According to aspects of this disclosure, video encoder 20 may encode one or more syntax elements for column 260 indicating that the entire column 260 is copied from column 256. The one or more syntax elements may be associated with a first entry of column 260 at the relative top of map 240. Video decoder 30 may obtain the syntax elements indicating the line copying and copy the index values of column 256 for column 260 when decoding column 260.

According to aspects of this disclosure, the techniques for coding so-called runs of entries may be used in conjunction with the techniques for line copying described above. For example, video encoder 20 may encode one or more syntax elements (e.g., a flag) indicating whether the value of an entry in a map is obtained from a palette or the value of an entry in the map is obtained from a previously coded line in map 240. Video encoder 20 may also encode one or more syntax elements indicating an index value of a palette or the location of the entry in the line (the row or column). Video encoder 20 may also encode one or more syntax elements indicating a number of consecutive entries that share the same value. Video decoder 30 may obtain such information from an encoded bitstream and use the information to reconstruct the map and pixel values for a block.

In an example for purposes of illustration, consider rows 264 and 268 of map 240. Assuming a horizontal, left to right scan direction, row 264 includes three index values of "1," two index values of "2," and three index values of "3." Row 268 includes five index values of "1" and three index values of "3." In this example, video encoder 20 may identify particular entries of row 264 followed by a run when encoding data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

In some examples, video encoder 20 may also determine whether to code the current pixel or index value relative to a position in another row (or column) or to code the current pixel or index value using a run syntax element. For example, after encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1. Hence, video encoder 20 encodes these two positions without reference to another line (or column). Video encoder 20 may then code the first position having an index value of 3 in row 268 relative to upper row 264 (e.g., indicating a copy from upper row 264 and the run of consecutive positions in the scan order having the same index value). Accordingly, according to aspects of this disclosure, video encoder 20 may select between coding pixel or index values of a line (or column) relative to other values of the line (or column), e.g., using a run, coding pixel or index values of a line (or column) relative to values of another line (or column), or a combination thereof. Video encoder 20 may, in some examples, perform a rate/distortion optimization to make the selection.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value.

In some instances, the line from which entries are copied may be directly adjacent to the entry of the line currently being coded (as illustrated in the examples of FIG. 5). However, in other examples, a number of lines may be buffered by video encoder 20 and/or video decoder 30, such that any of the number of lines of the map may be used as predictive entries for a line of the map currently being coded. Hence, in some examples, the pixel value for an entry may be signaled to be equal to a pixel value of an entry in a row immediately above (or column to the left of) or two or more rows above (or column to the left of) the current row.

In an example for purposes of illustration, video encoder 20 and/or video decoder 30 may be configured to store the previous n rows of entries prior to coding a current row of entries. In this example, video encoder 20 may indicate the predictive row (the row from which entries are copied) in a bitstream with a truncated unary code or other codes. In another example, video encoder 20 may encode (and video decoder 30 may decode) a displacement value between the current line and the predictive line of map 240 used as a reference for coding the current line. That is, video encoder 20 may encode an indication of a particular line (or column) from which an index value is copied. In some examples, the displacement value may be a displacement vector. That is, let $c[0], c[1], \ldots$, denote the indices of the current line of map 240 and let $u[0], u[1], u[2], \ldots$, denote the indices of a predictive line of map 240, such as an upper neighboring line. In this example, given a displacement vector is d, the index value for $c[i]$ may be predicted from $u[i+d]$. The value of d may be coded using unary, truncated unary, exponential Golomb or Golomb-Rice codes.

Figure 6:
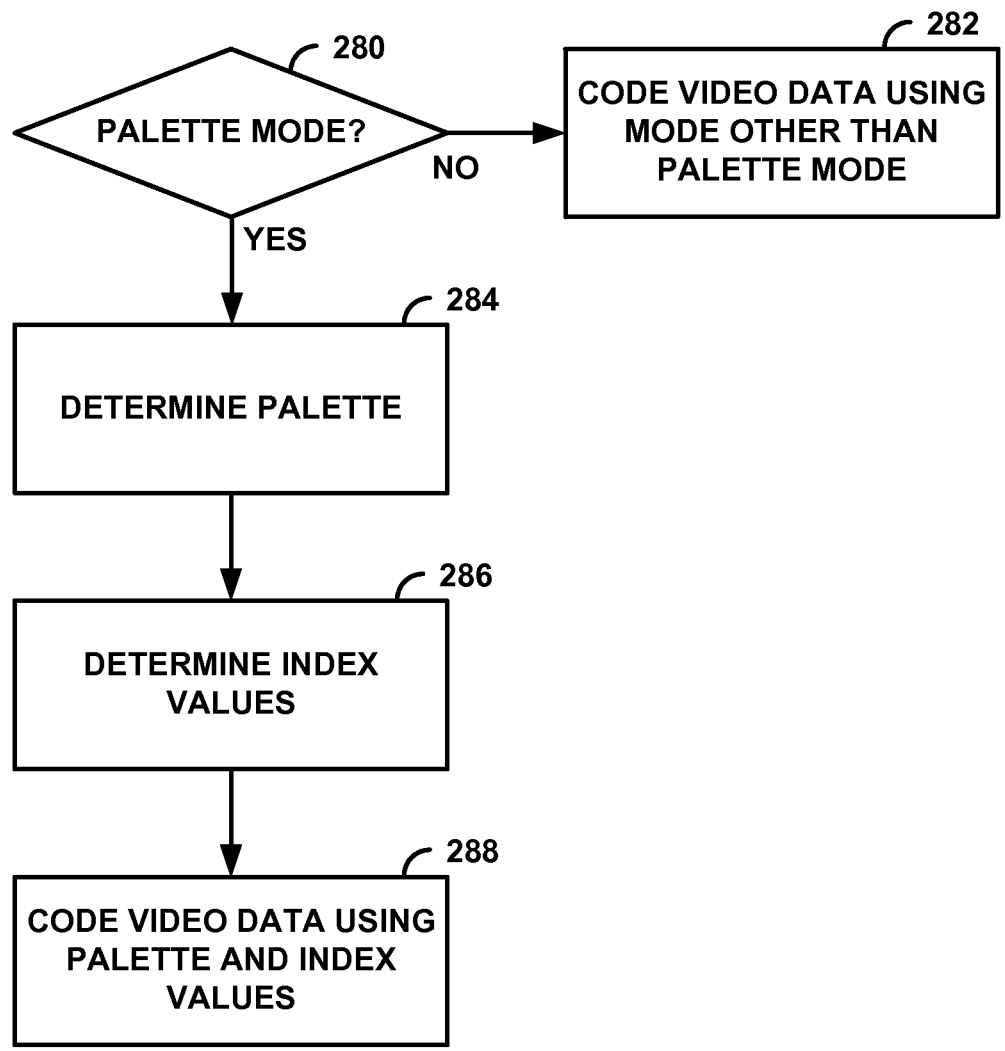
FIG. 6 is a flowchart illustrating an example process for coding video data using a palette coding mode, consistent with techniques of this disclosure.

FIG. 6 is a flowchart illustrating an example process for coding video data using a palette coding mode, consistent with techniques of this disclosure. The method of FIG. 6 is explained with respect to a video coder, such as video encoder 20 (FIGS. 1 and 2) or video decoder 30 (FIGS. 1 and 3). However, it should be understood that other video coding devices may be configured to perform a similar method.

Moreover, certain steps in the method may be performed in a different order or in parallel. Likewise, certain steps may be omitted, and other steps may be added, in various examples.

A video coder, such as video encoder and/or video decoder 30 may initially determine whether a mode for coding a current block of video data is a palette-based coding mode (280). As noted above, one or more syntax elements may be included in a bitstream indicating a coding mode of the current block (e.g., a PLT_Mode_flag syntax element). In other examples, the video coder may make a determination based on so-called side information, as noted above.

In any case, if a palette-based coding mode is not used for the block currently being coded (the "no" branch of step 280), the video coder may code the block of video data using a mode other than a palette-based coding mode (282). For example, the video coder may code the block of video data using a non-palette-based mode, such as an intra-mode, an inter-mode, or another coding mode.

If a palette-based coding mode is used for the block currently being coded (the "yes" branch of step 280), the video coder may determine a palette for coding the current block (284). As described with respect to FIGS. 7 and 8 below, in some examples, the video coder may determine the palette for the current block based on a palette associated with one or more other, previously coded blocks of video data.

The video coder may also determine index values for the block currently being coded (286). For example, as described with greater detail with respect to FIG. 9 below, the video coder may determine a map that indicates which pixel positions of the block are coded using an index value that relates a position of a pixel to an entry of the determined palette having an associated pixel value. In some instances, the video coder may determine one or more index values relative to other index values of the block. For example, the video coder may determine a run of index values and/or an index value based on an index value located in another line or column of the block.

The video coder then codes the video data of the block using the determined palette and index values (280). For example, with respect to video encoder 20, video encoder 20 may encode data indicating the palette as well as the index values in an encoded bitstream. Video encoder 20 may also encode, for any pixel positions not having a corresponding pixel in the determined palette, the actual pixel values or their quantized versions at such positions. Video decoder 30 may parse and decode the palette, index values, and pixel values from an encoded bitstream and use the data to reconstruct the block of video data.

Figure 7:
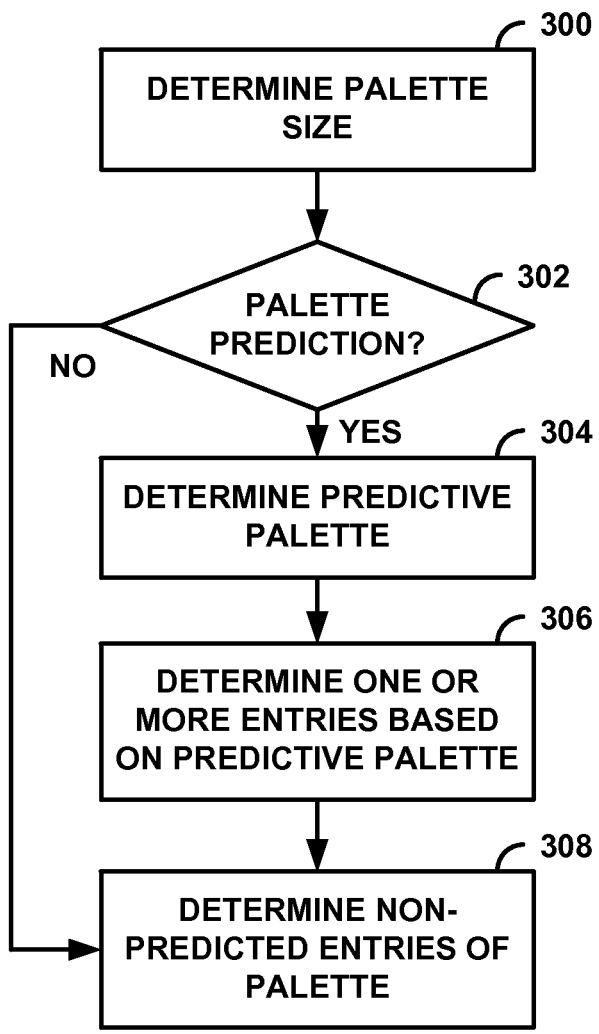
FIG. 7 is a flowchart illustrating an example process for determining a palette in palette-based coding, consistent with techniques of this disclosure.

FIG. 7 is a flowchart illustrating an example process for determining a palette in palette-based coding, consistent with techniques of this disclosure. The method of FIG. 7 is explained with respect to a video coder, such as video encoder 20 (FIGS. 1 and 2) or video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples. In some examples, the techniques of FIG. 7 may be performed during step 284 of FIG. 6.

In the example of FIG. 7, the video coder may determine a size of the palette (300). In some examples, the size of the palette may be fixed. In other examples, the size of the palette may be dynamically adjusted during coding (e.g., by adding or removing entries from the palette). The video coder may code one or more syntax elements indicating the size of the palette.

The video coder may determine whether the palette for coding the current block is predicted from one or more other, previously coded palettes (302). If the palette is predicted (the yes branch of step 302), the video coder may determine the predictive palette (304). For example, video encoder 20 may encode data indicating that the palette for the current block is based on one or more previously encoded palettes, as well as data indicating a location of a block associated with the predictive palette (or identifying the predictive palette itself). Likewise, video decoder 30 may obtain such data from an encoded bitstream. As described above with respect to FIG. 4, the predictive palette may be associated with a neighboring block of the block currently being coded.

The video coder may determine one or more entries of the palette for coding the current block based on one or more entries of the determined predictive palette (306). In some examples, the video coder may copy an entire palette from another block for coding the current block. In other examples, the video coder may selectively copy entries from another palette. The palette prediction may be based, in some examples, based on a frequency with which palette entries are used in one or more previously coded blocks.

The video coder may also determine one or more non-predicted entries of the palette (308). For example, in some instances, only a portion of a palette may be predicted from other previously coded palettes. In other instances, a palette may not be predictively coded at all. In such instances, the video coder may determine palette entries without (or after) performing the palette prediction techniques described herein.

Figure 8:
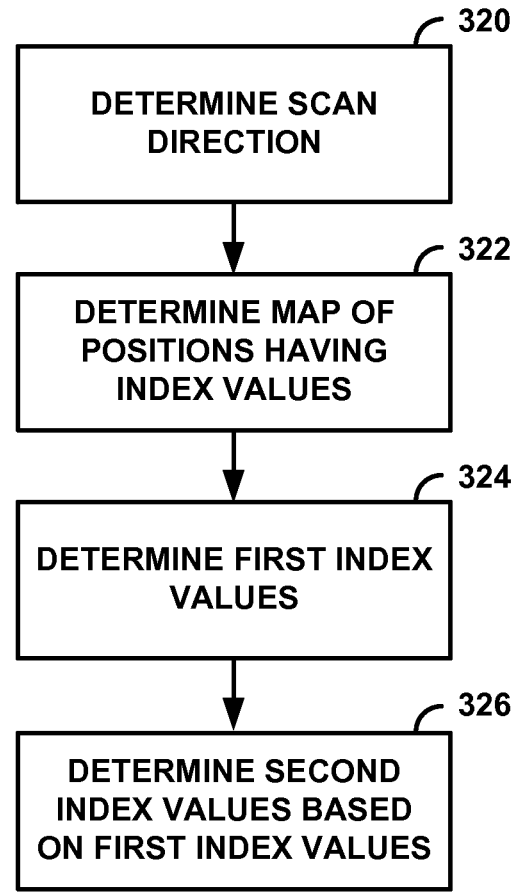
FIG. 8 is a flowchart illustrating an example process for determining indices of a block of video data in palette-based video coding, consistent with techniques of this disclosure.

FIG. 8 is a flowchart illustrating an example process for determining indices of a block of video data, consistent with techniques of this disclosure. The method of FIG. 8 is explained with respect to a video coder, such as video encoder 20 (FIGS. 1 and 2) or video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples. In some examples, the techniques of FIG. 8 may be performed during step 286 of FIG. 6.

The video coder may initially determine a scan direction, e.g., for scanning a map of index values in palette based coding (320). In some examples, as noted above with respect to the example of FIG. 5, the video coder may be preconfigured to use a particular scan direction. In other examples, the video coder may code one or more syntax elements indicating the scan direction and determine the scan direction based on the syntax elements. In still other examples, the video coder may determine the scan direction based on so-called side information.

The video coder may also determine a map of positions of the block of video data currently being coded that have associated index values of a palette. For example, one or more pixel values of the block currently being coded may not be represented in the palette from the block. In such examples, the video coder may code the pixel values directly (rather than coding an index value that identifies the pixel value in the palette). The map may indicate which pixel positions are associated with an index value and which pixel positions are not associated with an index value.

The video coder determines one or more first index values (324). For a given pixel in the block, the video coder may determine an index value that relates the pixel value of the given pixel to an entry in the palette for the block.

The video coder also determines one or more second index values based on the first index values (326). For example, as described above with respect to FIG. 5, the video coder may determine one or more index values relative to other already coded index values. In some examples, the video coder may determine second index values based on a run of consecutive same-valued index values. In other examples, the video coder may determine second index values based on one or more first index values included in a different line than the line of pixels currently being coded. In other examples, the video coder may apply a combination of techniques to determine the second index values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a predictor palette for constructing a current palette for a current block of video data, the predictor palette having a plurality of palette predictor entries that indicate respective color values, the predictor palette determined based on palette entries of palettes of a plurality of previously coded blocks of video data such that the plurality of palette predictor entries comprise color values from the palettes of the plurality of previously coded blocks, wherein the plurality of previously coded blocks of video data are different than the current block of video data;

decoding, from a video bitstream and for the current palette, a representation of a plurality of binary flags, each respective binary flag of the plurality of binary flags indicating whether or not a corresponding palette predictor entry in the predictor palette is to be added to the current palette for the current block of video data;

constructing the current palette for the current block of video data based on the predictor palette, wherein constructing the current palette comprises adding, to the current palette for the current block, one or more palette entries of the plurality of palette predictor entries of the predictor palette indicated by corresponding binary flags of the plurality of binary flags as to be added to the current palette; and decoding pixels of the current block of video data using the current palette by at least:
   obtaining, from the video bitstream, respective index values for one or more of the pixels, each of the respective index values identifying an entry of the current palette; and
   determining values for the one more pixels by matching the respective index values to at least one of the entries of the current palette.

2. The method of claim 1, further comprising:
determining that the one or more entries of the current palette include fewer than all of the palette predictor entries; and
in response to determining that the one or more entries of the current palette include fewer than all of the palette predictor entries, decoding, from the video bitstream, data that indicates palette entries of the current palette that are not included in the predictor palette.

3. The method of claim 1, further comprising:
assigning index values to the one or more entries of the current palette based on the one or more entries of the current palette being included in the predictor palette, including assigning a relatively lower index value to the one or more entries of the current palette that are included in the predictor palette than any other entries of the current palette.

4. The method of claim 1, further comprising:
decoding, from the video bitstream, a palette prediction syntax element that indicates that the one or more entries of the current palette are based on the palette predictor entries.

5. The method of claim 1, further comprising determining a size of the current palette, wherein determining the size of the current palette comprises at least one of:
determining that the size of the current palette is fixed;
determining that the size of the current palette is variable and based on data coded with the current block of video data;
determining the size of the current palette based on a characteristic of the current block of video data; or
determining the size of the current palette based on data coded with the current block of video data indicating a final entry in the current palette.

6. An apparatus for decoding video data, the apparatus comprising:
a memory storing video data; and
one or more processors implemented in circuitry and configured to:
   determine a predictor palette for constructing a current palette for a current block of video data, the predictor palette having a plurality of palette predictor entries that indicate respective color values, to determine the predictor palette, the one or more processors are configured to determine the predictor palette based on palette entries of palettes of a plurality of previously coded blocks of video data such that the plurality of palette predictor entries comprise color values from the palettes of the plurality of previously coded blocks;
   decode, from a video bitstream and for the current palette, a representation of a plurality of binary flags, each respective binary flag of the plurality of binary flags indicating whether or not a corresponding palette predictor entry in the predictor palette is to be added to the current palette for the current block of video data;
   construct the current palette for the current block of video data based on the predictor palette, wherein, to construct the current palette, the one or more processors are configured to add, to the current palette, one or more palette entries of the plurality of palette predictor entries of the predictor palette indicated by corresponding binary flags of the plurality of binary flags as to be added to the current palette; and
   decode pixels of the current block of the video data using the current palette, the one or more processors configured to decode the pixels of the current block by at least:
      obtaining, from the video bitstream, respective index values for one or more of the pixels, each of the respective index values identifying an entry of the current palette; and
      determining values for the one more pixels by matching the respective index values to at least one of the entries of the current palette.

7. The apparatus of claim 6, wherein the one or more processors are further configured to:
determine that the one or more entries of the current palette include fewer than all of the palette predictor entries; and
when the one or more entries of the current palette include fewer than all of the palette predictor entries, decode, from the video bitstream, data that indicates palette entries of the current palette that are not included in the predictor palette.

8. The apparatus of claim 6, wherein the one or more processors are further configured to:
assign index values to the one or more entries of the current palette based on the one or more entries of the current palette being included in the predictor palette, including assigning a relatively lower index value to the one or more entries of the current palette that are included in the predictor palette than any other entries of the current palette.

9. The apparatus of claim 6, wherein the one or more processors are further configured to decode, from the video bitstream, a palette prediction syntax element that indicates that the one or more entries of the current palette are based on the palette predictor entries.

10. The apparatus of claim 6, wherein the one or more processors are further configured to determine a size of the current palette, wherein to determine the size of the current palette, the one or more processors are configured to:
determine that the size of the current palette is fixed;
determine that the size of the current palette is variable and based on data coded with the second block of video data;

determine the size of the current palette based on a characteristic of the second block of video data; or determine the size of the current palette based on data coded with the second block of video data indicating a final entry in the current palette.

11. The method of claim 1, the method being executable on a wireless communication device, wherein the wireless communication device comprises:
a memory configured to store the current block of video data;
a processor configured to execute instructions to process the current block of video data stored in said memory; and
a receiver configured to receive the video bitstream.

12. The method of claim 11, wherein the wireless communication device is a cellular telephone and the video bitstream is received by the receiver and modulated according to a cellular communication standard.

13. The apparatus of claim 6, wherein the apparatus is a wireless communication device that includes the memory and the one or more processors, the wireless communication device further comprising a receiver configured to receive the current block of video data.

14. The apparatus of claim 13, wherein the wireless communication device is a cellular telephone and the video bitstream is received by the receiver and modulated according to a cellular communication standard.

15. A method of encoding video data, the method comprising:
determining a predictor palette for constructing a current palette for a current block of video data, the predictor palette having a plurality of palette predictor entries that indicate respective color values, the predictor palette determined based on palette entries of palettes of a plurality of previously coded blocks of video data such that the plurality of palette predictor entries comprise color values from the palettes of the plurality of previously coded blocks;
constructing the current palette for the current block of video data based on the predictor palette, wherein constructing the current palette comprises adding, to the current palette, one or more palette entries of the plurality of palette predictor entries of the predictor palette;
encoding, in a video bitstream and for the current palette, a representation of a plurality of binary flags, each respective binary flag of the plurality of binary flags indicating whether or not a corresponding palette predictor entry in the predictor palette is to be added to the current palette for the current block of video data; and
encoding pixels of the current block of video data using the current palette by at least:
determining respective index values that identify respective entries of the current palette for one or more of the pixels; and
encoding the index values in the video bitstream.

16. The method of claim 15, further comprising:
determining a frequency with which each palette predictor entry of the predictor palette is used to code pixels of the plurality of blocks; and
encoding, in the video bitstream, data identifying each palette predictor entry of the predictor palette based on the frequency.

17. The method of claim 15, further comprising:
determining that the one or more entries of the current palette include fewer than all of the palette predictor entries; and in response to determining that the one or more entries of the current palette include fewer than all of the palette predictor entries, encoding, in the video bitstream, data that indicates palette entries of the current palette that are not included in the predictor palette.

18. The method of claim 15, further comprising:
encoding, in the video bitstream, a palette prediction syntax element that indicates that the one or more entries of the current palette are based on the palette predictor entries.

19. The method of claim 15, the method being executable on a wireless communication device, wherein the wireless communication device comprises:
a memory configured to store the current block of video data;
a processor configured to execute instructions to process the current block of video data stored in said memory; and
a transmitter configured to transmit the video bitstream.

20. The method of claim 19, wherein the wireless communication device is a cellular telephone and the video bitstream is transmitted by the transmitter and modulated according to a cellular communication standard.

21. An apparatus for encoding video data, the apparatus comprising:
a memory storing video data; and
one or more processors implemented in circuitry and configured to:
determine a predictor palette for constructing a current palette for a current block of video data, the predictor palette having a plurality of palette predictor entries that indicate respective color values, to determine the predictor palette, the one or more processors are configured to determine the predictor palette based on palette entries of palettes of a plurality of previously coded blocks of video data such that the plurality of palette predictor entries comprise color values from the palettes of the plurality of previously coded blocks;
construct the current palette for the current block of video data based on the predictor palette, wherein, to construct the current palette, the one or more processors are configured to add, to the current palette, one or more palette entries of the plurality of palette predictor entries of the predictor palette;
encode, in a video bitstream and for the current palette, a representation of a plurality of binary flags, each respective binary flag of the plurality of binary flags indicating whether or not a corresponding palette predictor entry in the predictor palette is to be added to the current palette for the current block of video data; and
encode pixels of the current block of video data using the current palette, the one or more processors configured to encode the pixels of the current block by at least:
determining respective index values that identify respective entries of the current palette for one or more of the pixels; and
encoding the index values in the video bitstream.

22. The apparatus of claim 21, wherein the one or more processors are further configured to:
determine a frequency with which each palette predictor entry of the predictor palette is used to code pixels of the plurality of blocks; and encode, in the video bitstream, data identifying each palette predictor entry of the predictor palette based on the frequency.

23. The apparatus of claim 21, wherein the one or more processors are further configured to:
determine that the one or more entries of the current palette include fewer than all of the palette predictor entries; and
when the one or more entries of the current palette include fewer than all of the palette predictor entries, encode, in the video bitstream, data that indicates palette entries of the current palette that are not included in the predictor palette.

24. The apparatus of claim 21, wherein the one or more processors are further configured to:
encode, in the video bitstream, a palette prediction syntax element that indicates that the one or more entries of the current palette are based on the palette predictor entries.

25. The apparatus of claim 21, wherein the apparatus is a wireless communication device that includes the memory, the one or more processors, and a transmitter configured to transmit the video bitstream.

26. The apparatus of claim 25, wherein the wireless communication device is a cellular telephone and the video bitstream is transmitted by the transmitter and modulated according to a cellular communication standard.

27. The method of claim 1, further comprising:
outputting, for display, the decoded pixels of the current block.

28. The method of claim 15, further comprising:
outputting the video bitstream.

* * * * *